United States Patent
Kume et al.

(10) Patent No.: US 8,424,426 B2
(45) Date of Patent: Apr. 23, 2013

(54) METHOD AND DEVICE FOR BORING NON-ROUND HOLE

(75) Inventors: Masao Kume, Tochigi (JP); Jin Fukumitsu, Tochigi (JP); Naoya Matsunaga, Tochigi (JP); Keisuke Takahashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 381 days.

(21) Appl. No.: 12/936,876

(22) PCT Filed: Mar. 4, 2009

(86) PCT No.: PCT/JP2009/054068
§ 371 (c)(1),
(2), (4) Date: Oct. 7, 2010

(87) PCT Pub. No.: WO2009/125638
PCT Pub. Date: Oct. 15, 2009

(65) Prior Publication Data
US 2011/0023667 A1  Feb. 3, 2011

(30) Foreign Application Priority Data

Apr. 11, 2008 (JP) .................................. 2008-103214
Jul. 8, 2008 (JP) .................................. 2008-177563

(51) Int. Cl.
*B23B 41/04* (2006.01)
*B23B 41/12* (2006.01)

(52) U.S. Cl.
USPC .................................. 82/1.11; 82/1.3; 408/1 R

(58) Field of Classification Search ............ 82/1.11, 82/1.2, 1.3, 1.4, 118; 408/3, 1 R; 702/33
See application file for complete search history.

(56) References Cited

U.S. PATENT DOCUMENTS 4,432,258 A * 2/1984 Currer ............................. 82/1.2
4,612,831 A * 9/1986 Lehmkuhl ........................ 82/1.4
(Continued)

FOREIGN PATENT DOCUMENTS

EP        0 654 315 A1   5/1995
GB         556 532 A    10/1943
(Continued)

OTHER PUBLICATIONS

Office Action issued to EP Application No. 09729510.9, mailed Apr. 17, 2012.
(Continued)

*Primary Examiner* — Will Fridie, Jr.
(74) *Attorney, Agent, or Firm* — Arent Fox LLP

(57) ABSTRACT

A non-round hole boring device capable of machining a work in a desired cross sectional shape by a simple configuration. The non-round hole boring device (1) comprises cylindrical arbors (11, 21), shafts (12, 22) stored in the arbors (11, 21), respectively, a cutting tool (13) attached to the outer peripheral surface of the arbor (11), a cam (121) formed on the shaft (12) and pressing the cutting tool (13), a first rotary encoder (252), a second rotary encoder (241), an arbor motor (23) for rotatingly driving the arbors (11, 21), a shaft motor (24) for rotatingly driving the shafts (12, 22), and a controller (40). The controller (40) advances or retards the phases of the rotating angles of the shafts (12, 22) relative to the phases of the rotating angles of the arbors (11, 21), respectively, while rotating the arbors (11, 21) and the shafts (12, 22) in synchronism with each other, respectively. Consequently, the cutting tool (13) is pressed by the cam (121) to adjust the projecting dimension of the cutting tool (13).

9 Claims, 17 Drawing Sheets

U.S. PATENT DOCUMENTS

| | | | |
|---|---|---|---|
| 4,979,852 A * | 12/1990 | Noggle | 408/156 |
| 6,315,503 B1 * | 11/2001 | Oswald et al. | 408/1 R |
| 6,705,184 B2 * | 3/2004 | Cardemon et al. | 82/1.11 |
| 7,172,034 B2 * | 2/2007 | Makiyama et al. | 173/1 |
| 7,272,877 B2 * | 9/2007 | Cardemon et al. | 29/26 A |

FOREIGN PATENT DOCUMENTS

| | | |
|---|---|---|
| JP | 6-55318 A | 3/1994 |
| JP | 2000-205854 A | 7/2000 |
| JP | 2005-246494 A | 9/2005 |
| JP | 2007-313619 A | 12/2007 |

OTHER PUBLICATIONS

"Process Control Engineering", Wiley-VCH Verlag GmbH & Co., Weinheim, 2005, pp. 75-80.

J Webster, "Industrial Control", Wiley Encyclopedia of Electrical and Electronics Engineering, 1991, pp. 1-11, John Wiley & Sons.

D. Roy Choudhury, "Modern Control Engineering", Prentice-Hall of India Private Ltd., Jul. 2005, pp. 420-421.

Leonard Sokoloff, GPIB instrument Control, Proceedings of the 2002 ASEE Annual Conference, 2002.

George Ellis, "Use Control Theory to Improve Servo Performance", Sep. 9, 1991.

Schenck, Ro Tec GmbH, "CAB 920—The Measuring System for Peak Balancing Performance".

Office Action issued to EP Application No. 12151205.7, mailed Aug. 22, 2012.

* cited by examiner

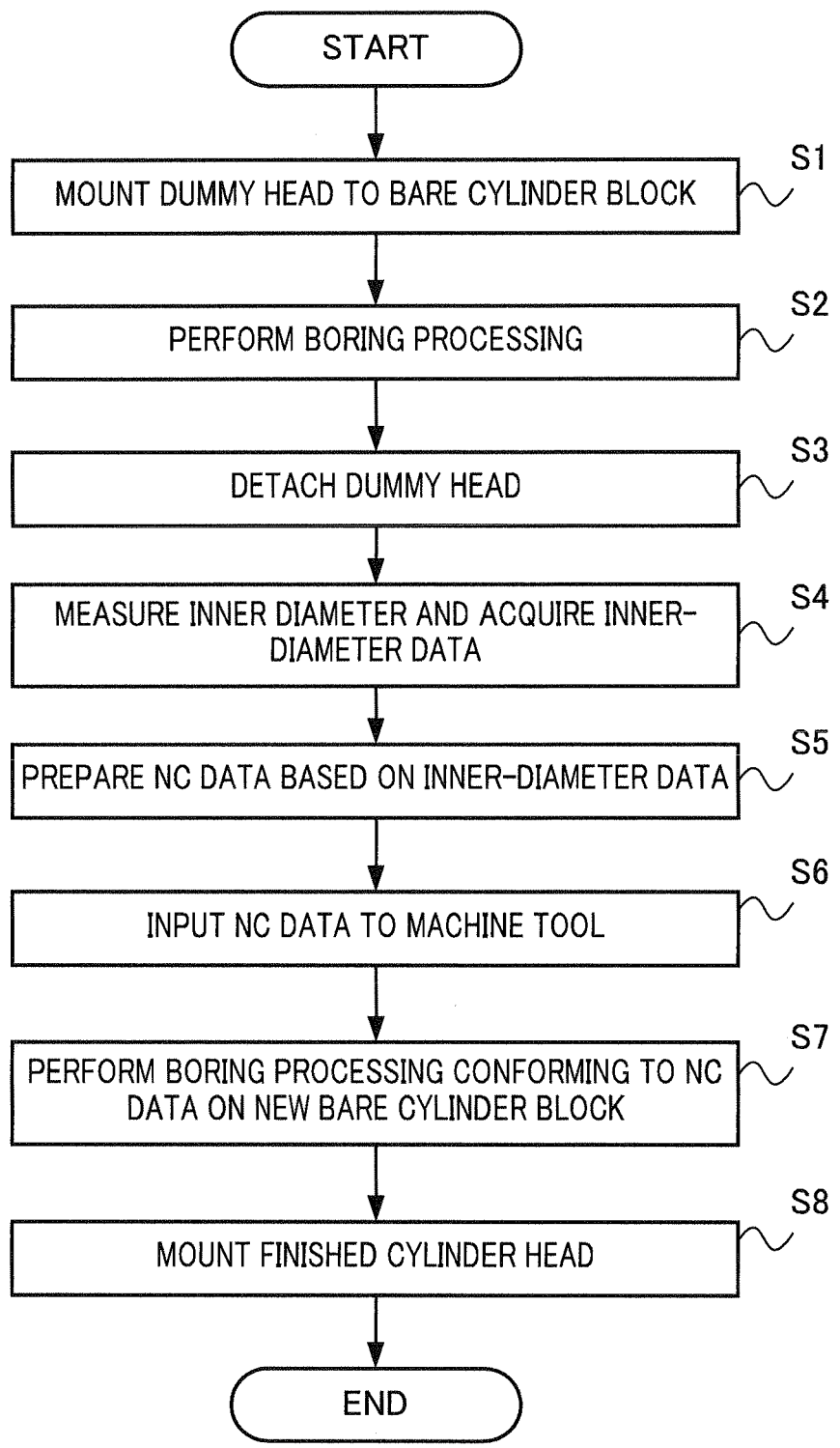

FIG. 9A
FIG. 9B
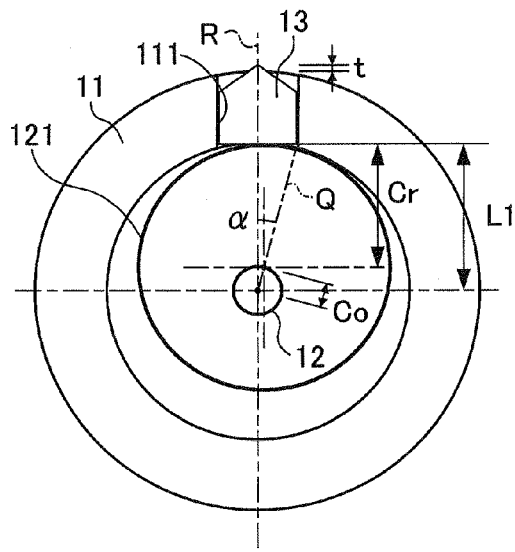
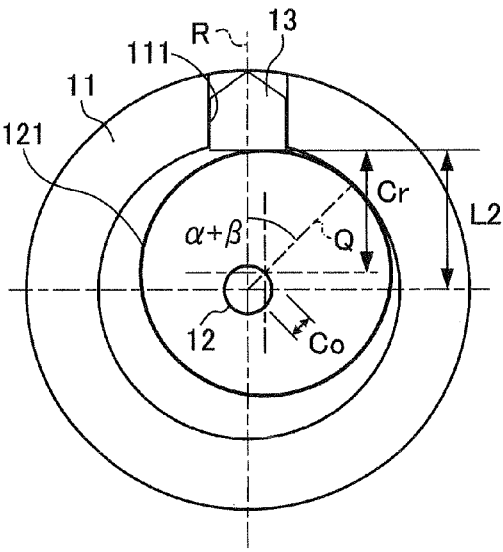
FIG. 10
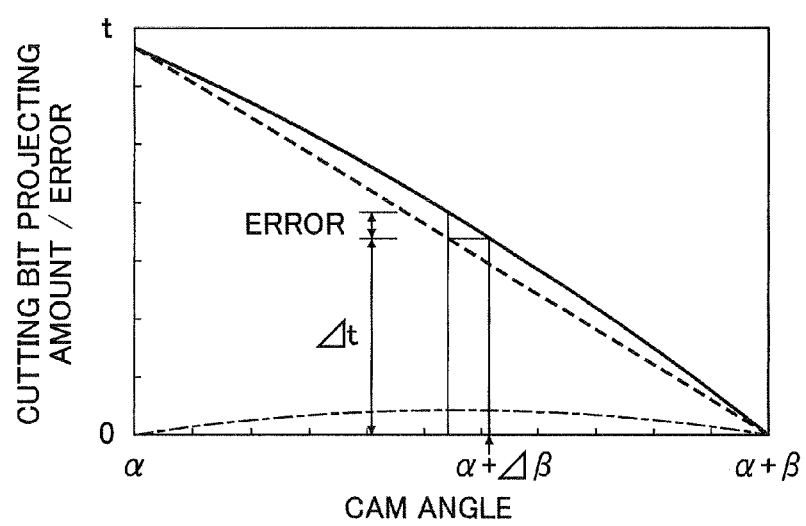

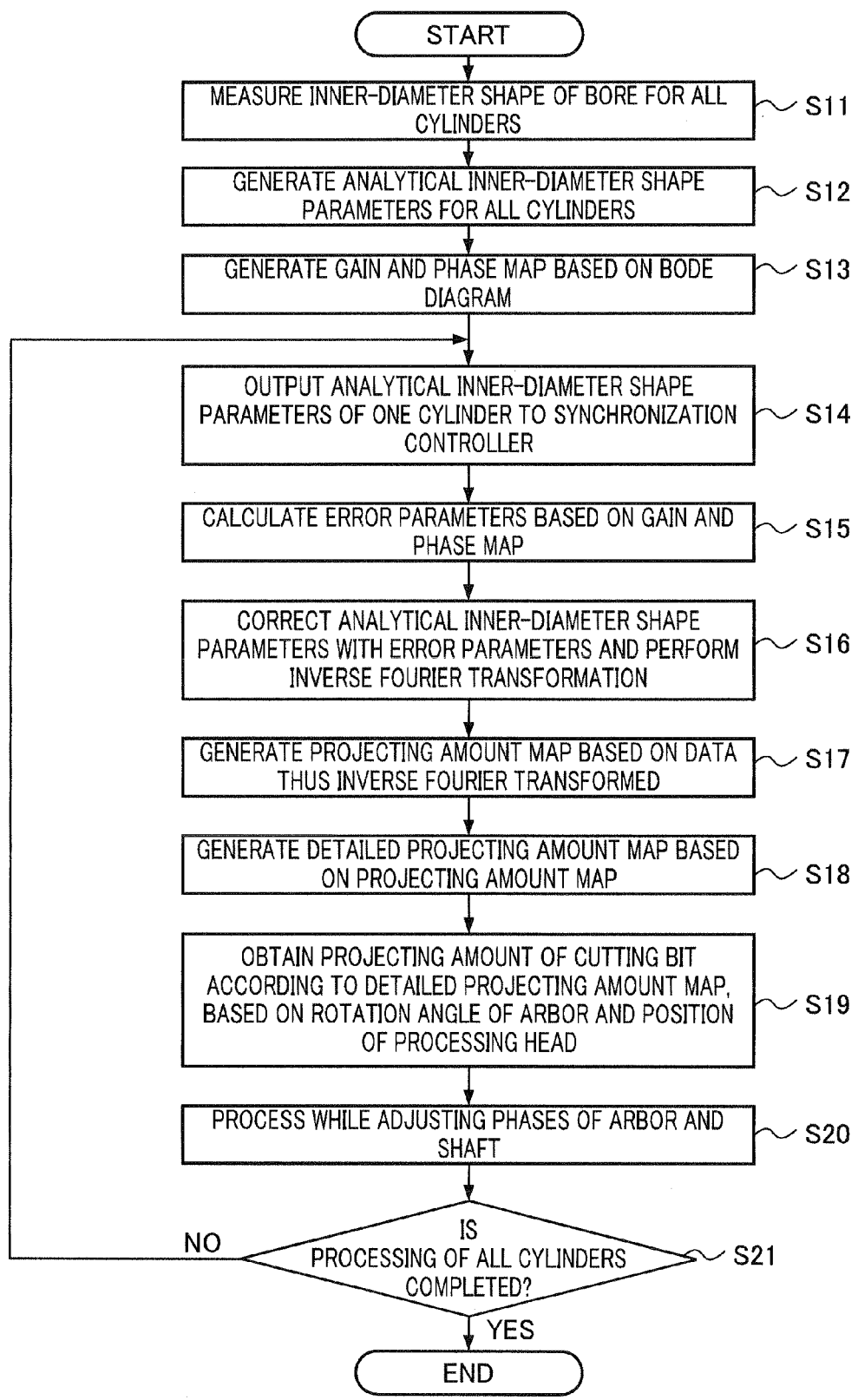

ROTATION ANGLE

ROTATION ANGLE

METHOD AND DEVICE FOR BORING NON-ROUND HOLE

CROSS-REFERENCE TO RELATED APPLICATION

This application is a National Stage entry of International Application No. PCT/JP2009/054068, filed Mar. 4, 2009, which claims priority to Japanese Patent Application Nos. 2008-103214, filed Apr. 11, 2008 and 2008-177563, filed Jul. 8, 2008 the disclosure of the prior applications are incorporated in its entirety by reference

TECHNICAL FIELD

The present invention relates to a method for boring a non-round hole and a device for boring a non-round hole. More specifically, it relates to a method for boring a non-round hole and a device for boring a non-round hole for forming a hole of a shape that is the same as a hole of a non-round cross-sectional shape that has already been formed.

BACKGROUND ART

Conventionally, in a manufacturing process of automobiles, the bores of the cylinder block of an engine are machine processed, after which the cylinder head, crank case, etc, are mated to the cylinder block.

Herein, since the pistons accommodated in the bores are round cross-sectional shapes, the cross-sectional shapes of the bores are machine processed so as to become in a state of nearly a circle.

However, even if the bores of a cylinder block were processed to be a round cross-sectional shape, the shape of the bores would deform when the cylinder head, crank case, etc. are mated. When a bore deforms in such a way, it is a primary cause increasing the sliding resistance between the bore and piston during operation of the engine, and the engine may not be able to realize the desired performance.

Therefore, when processing the bores of a cylinder block, a dummy head replicating a cylinder head is attached and processing on the bore is performed, and when the processing on the bore finishes, the dummy head is detached.

However, when carrying out attachment and detachment of the dummy head and the like every time bore processing the cylinder block, there is a problem in that productivity declines greatly.

In order to solve this problem, the following method has been proposed (refer to Patent Document 1).

Specifically, first, a dummy head is mounted to the cylinder block, and the bores are processed into a round cross-sectional shape by a machine tool.

Next, the dummy head is detached from the cylinder block. When this is done, the shape of the bore deforms and becomes a non-round cross-sectional shape since the stress from mating of the dummy head is eliminated. The overall shape of the bore after this dummy head has been detached is measured to generate NC data.

Thereafter, boring processing of the cylinder block is performed based on the NC data thus generated, without mounting a dummy head. If done in this way, the bore will become a round shape when the cylinder head is mounted, even if the bore is processed without mating a dummy head to the cylinder block.

In addition, in Patent Document 1, in order to form a bore with a cross-sectional shape that is non-round as described above, the following processing head of a machine tool has been proposed.

Specifically, the processing head includes a spindle shaft of a cylindrical shape, a shaft stored inside of this spindle shaft to freely advance and retract in an axial direction, and a boring bit that is provided at a tip end of the spindle shaft to be able to project and retract in a centrifugal direction. A taper portion abutting a base end side of the bit and a grindstone is provided in a tip end of the shaft.

According to this machine tool, by causing the shaft to advance or retract, the base-end sides of the bit and the grindstone are pressed by the taper portion, and thus the projecting amount of these bits can be adjusted. Therefore, the bore can be processed to a desired cross-sectional shape by adjusting the projecting amounts of the bit and grindstone while causing the spindle shaft to rotate.

Patent Document 1: Japanese Unexamined Patent Application, Publication No. 2007-313619

DISCLOSURE OF THE INVENTION

Problems to be Solved by the Invention

Incidentally, in order to shorten the cycle time, processing bores of non-round cross-sectional shape as described above at high speed has been demanded.

Consequently, when processing a bore of non-round cross-sectional shape at high speed using the machine tool exemplified in Patent Document 1, it is necessary to cause the shaft to advance and retract at high speed. However, in order to advance and retract the shaft at high speed, it is necessary to provide a linear guide, rotary joint, or the like using a linear motor, and thus the structure of the machine tool becomes complex.

In addition, since the bore deformation amounts when the dummy head is detached from the cylinder block is not necessarily uniform, the cross-sectional shape of the bore is different at each measurement point. Therefore, when converting the cross-sectional shape at each measurement point to NC data without alteration, the data volume becomes enormous and the data cannot be completely processed, whereby the processing speed of the machine tool declines.

Furthermore, since high-order noise is included in the cross-sectional shape actually measured, when this noise is included to generate NC data, there is a problem in that the motor of the machine tool vibrates. In order to solve this problem, it is necessary to perform filtering on the data; however, the phase may shift near a cut-off frequency depending on the filtering method, and thus processing precision may decline.

It is an object of the present invention to provide a device for boring a non-round hole that is a simple configuration and can perform high-speed processing on a work into a desired cross-sectional shape.

In addition, it is an object of the present invention to provide a method for boring a non-round hole and a device for boring a non-round hole that can process a work at high speed and with high precision.

Means for Solving the Problems

According to a device for boring a non-round hole of the present invention (e.g., the device for boring a non-round hole 1 described later), the device includes: a first rotating shaft of cylindrical shape (e.g., the arbor 11, 21 described later); a second rotating shaft that is stored inside of the first rotating shaft (e.g., the shaft 12, 22 described later); a processing tool (e.g., the cutting bit 13 and honing stones 14A, 14B described later) that is provided to an outer-circumferential face of the first rotating shaft to be able to project and retract; a cam (e.g., the cams 121 to 125 described later) that is provided to the second rotating shaft and presses the processing tool in a projecting direction; a first detection means (e.g., the first rotary encoder 252 described later) for detecting a rotation angle and rotation amount of the first rotating shaft; a second detection means (e.g., the second rotary encoder 241 described later) for detecting a rotation angle and rotation amount of the second rotating shaft; a first drive means (e.g., the arbor motor 23 described later) for rotationally driving the first rotating shaft; a second drive means (e.g., the shaft motor 24 described later) for rotationally driving the second rotating shaft; and a control means (e.g., the control device 40 described later) for controlling the first drive means and the second drive means based on the rotation angles and rotation amounts detected by the first detection means and second detection means, respectively, in which the control means includes a processing tool control means (e.g., the synchronization controller 42 described later) for controlling projection of the processing tool, and presses a base-end side of the processing tool by the cam and adjusts a projecting dimension of the processing tool by causing the first rotating shaft and the second rotating shaft to synchronously rotate, while causing a phase of the rotation angle of the second rotating shaft to advance or retard relative to a phase of the rotation angle of the first rotating shaft.

In this case, the processing tool is preferably a cutting bit.

According to the present invention, the protruding dimension of the processing tool is adjusted by advancing or retarding the phase of the rotation angle of the second rotating shaft relative to the phase of the rotation angle of the first rotating shaft to generate a phase difference, and causing a pressing amount of the cam on the processing tool to change according to this phase difference.

Accordingly, since all that is formed is the cam, a work can be processed at high speed to a desired cross-sectional shape by a simple configuration because a shaft is not caused to advance and retract as is conventionally.

According to a method for boring a non-round hole of the present invention, in which a shape in which a hole of non-round cross-sectional shape already formed is measured, and another hole of a shape identical to the hole already formed and measured is formed in a work, the method includes: an inner-diameter shape data acquisition step of setting a plurality of measurement points (e.g., the measurement points M1 to M4 describes later) on an axis of a hole already formed, and measuring and acquiring as inner-diameter data an inner-diameter shape of the hole at each of the plurality of measurement points; an analytical inner-diameter shape parameter calculation step of frequency analyzing the inner-diameter shape data, and calculating an amplitude value and phase lag of frequency components from the $0^{th}$ order to $n^{th}$ order (n is a positive integer) as an analytical inner-diameter shape parameter; and an analytical inner-diameter shape parameter storage step of storing the inner-diameter shape parameter in an electronic storage medium of a processing device.

According to a method of boring a non-round hole according to the present invention, in which a bore (e.g., the bore 61 described later) of a shape identical to a bore (e.g., the bore 61A described later) of a non-round cross-sectional shape formed in a cylinder block (e.g., the cylinder block 60 described later) is formed in another bare cylinder block (e.g., the cylinder block 60A described later), the method includes: a preparation step of mounting a dummy head (e.g., the dummy head 70 described later) replicating a finished cylinder head to the bare cylinder block, forming a bore by way of boring processing, and then detaching the dummy head from the cylinder block after having formed the bore; an inner-diameter shape data acquisition step of setting a plurality of measurement points (e.g., the measurement points M1 to M4 described later) on an axis of the bore, and measuring and acquiring as inner-diameter data an inner-diameter shape of the bore at each of the plurality of measurement points; an analytical inner-diameter shape parameter calculation step of frequency analyzing the inner-diameter shape data, and calculating an amplitude value and phase value of frequency components from $0^{th}$ order to $n^{th}$ order (n is a positive integer) as an analytical inner-diameter shape parameter; and an analytical inner-diameter shape parameter storage step of storing the inner-diameter shape parameter in an electronic storage medium of a processing device.

According to this invention, since frequency analysis is performed on inner-diameter data and amplitude values and phase values of the frequency components from $0^{th}$ order to $n^{th}$ order are calculated as analytical inner-diameter shape parameters, the data volume can be decreased greatly compared to conventionally, and thus a work can be processed at high speed.

In addition, only frequency components of low order from among complex inner-diameter shape data containing high-order noise are extracted, and the analytical inner-diameter shape parameters are generated only with the low order frequency components thus extracted; therefore, it is possible to suppress the phases from collapsing while also remarkably having a shape filter effect by removing high-order noise. Herein, phases collapsing is the matter of the phase of the tip-end side, i.e. processing-head side, lagging more than the phase of the base-end side, i.e. drive side, for the shaft connected to the processing head, as shown in the Bode diagram of FIG. 12. Therefore, when the processing device is driven based on this analytical inner-diameter shape parameter, processing a work with high precision is possible because vibration can be reduced.

In this case, it is preferable to further include: a Bode diagram storage step of generating a Bode diagram plotting a relationship between a drive frequency of a processing head (e.g., the processing head 10 described later) and a gain and phase lag of the processing head, and storing the Bode diagram in an electronic storage medium of a processing device as a Bode diagram map; an error parameter calculation step of obtaining frequency components of an applied drive frequency of the processing head from $0^{th}$ order to $n^{th}$ order, and calculating, based on the Bode diagram map, a gain and phase lag of each of the frequency components as an error parameter; a synthetic inner-diameter shape map generation step of inverting an amplitude value and phase value of frequency components from $0^{th}$ order to $n^{th}$ order calculated in the analytical inner-diameter shape parameter calculation step, after having been corrected and synthesized with the gain and phase lag of each frequency component calculated in the error parameter calculation step, setting the amplitude of data thus inverted to be a projecting amount of a processing tool provided in the processing head to be able to project and retract, and generating a projecting amount map showing a relationship between the projecting amount and a rotation angle of the processing tool; and a boring step of causing the processing tool to project according to the projecting amount map, and conducting boring processing on an unprocessed work.

In this case, the $n^{th}$ order is preferably $4^{th}$ order.

According to this invention, the gain and phase lag are obtained from the Bode diagram and set as an error parameter. Then, the amplitude value and phase value of frequency components from $0^{th}$ order to $n^{th}$ order are corrected using this error parameter. Accordingly, boring processing can be performed taking into account of the mechanical characteristics of the processing head.

According to a device for boring a non-round hole of the present invention (e.g., the device for boring a non-round hole 1 described later) that measures a shape of a hole of a non-round cross-sectional shape already formed, and forms another hole in a work of a shape identical to the hole already formed and measured, in which the device includes: an inner-diameter shape data acquisition means (e.g., the roundness measuring instrument 51 described later) for setting a plurality of measurement points on an axis of the hole already formed, and measuring and acquiring as inner-diameter shape data an inner-diameter shape of the hole at each of the plurality of measurement points; an analytical inner-diameter shape parameter calculation means (e.g., the host computer 52 described later) for frequency analyzing the inner-diameter shape data, and calculating an amplitude value and phase value of frequency components from $0^{th}$ order to $n^{th}$ order (n is a positive integer) as an analytical inner-diameter shape parameter; and an analytical inner-diameter shape parameter storage means (e.g., the host computer 52) for storing the inner-diameter shape parameter thus calculated by the analytical inner-diameter shape parameter calculation means.

In this case, it is preferable to further include: a Bode diagram storage means (e.g., the host computer 52 described later) for storing a Bode diagram plotting a relationship between a drive frequency of a processing head and a gain and phase lag of the processing head as a Bode diagram map; an error parameter calculation means (e.g., the synchronization controller 42 described later) for obtaining frequency components from $0^{th}$ order to $n^{th}$ order of an applied drive frequency of the processing head, and calculating, based on the Bode diagram map, a gain and phase lag of each of the frequency components based on the Bode diagram, as an error parameter; a synthetic inner-diameter shape map generation means (e.g., the synchronization controller 42 described later) for inverting an amplitude value and phase value of frequency components from $0^{th}$ order to $n^{th}$ order calculated by the analytical inner-diameter shape parameter calculation means, after having been corrected and synthesized with the gain and phase lag of each frequency component calculated in the error parameter calculation step, setting the amplitude of data thus inverted to be a projecting amount of a processing tool provided in the processing head to be able to project and retract, and generating a projecting amount map showing a relationship between the projecting amount and a rotation angle of the processing tool; and a processing tool control means (e.g., the synchronization controller 42 described later) for performing projection control on the processing tool according to the projecting amount map.

In this case, the $n^{th}$ order is preferably $4^{th}$ order.

According to this invention, there are effects similar to the aforementioned effects.

Effects of the Invention

According to the present invention, since all that is formed is the cam, a work can be processed at high speed to a desired cross-sectional shape by a simple configuration because a shaft is not caused to advance and retract as is conventionally.

According to the present invention, since frequency analysis is performed on inner-diameter data and amplitude values and phase values of the frequency components from $0^{th}$ order to $n^{th}$ order are calculated as analytical inner-diameter shape parameters, the data volume can be decreased greatly compared to conventionally, and thus a work can be processed at high speed.

In addition, only frequency components of low order from among complex inner-diameter shape data containing high-order noise are extracted, and the analytical inner-diameter shape parameters are generated only with the low order frequency components thus extracted; therefore, it is possible to suppress the phases from collapsing while also remarkably having a shape filter effect by removing high-order noise. Therefore, when the processing device is driven based on this analytical inner-diameter shape parameter, processing a work with high precision is possible because vibration can be reduced.

BRIEF DESCRIPTION OF THE DRAWINGS

FIG. 5 is a flowchart showing a sequence of boring processing a bore of a cylinder block using the device for boring a non-round hole according to the embodiment;

FIG. 9 is a schematic diagram showing a projecting amount of a cam of the device for boring a non-round hole according to the embodiment;

FIG. 10 is a graph showing a relationship between the cam angle and the projecting amount of the cutting bit of the device for boring a non-round hole according to the embodiment;

FIG. 15 is a flowchart showing a detailed sequence from measurement of a bore inner-diameter shape until boring processing of the device for boring a non-round hole according to the embodiment;

Figure 1:
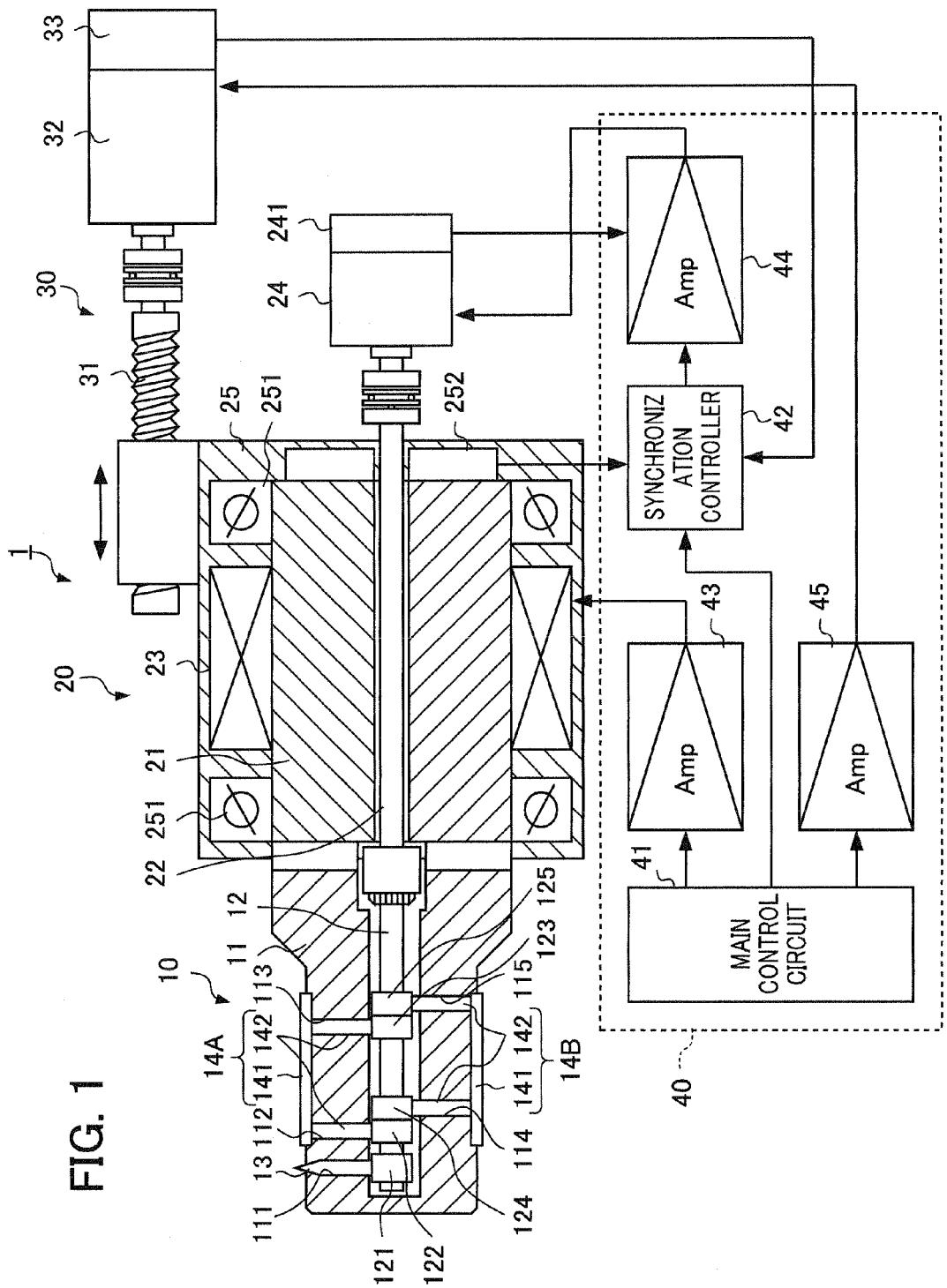
FIG. 1 is a schematic configuration diagram of a device for boring a non-round hole according to a first embodiment of the present invention.

EXPLANATION OF REFERENCE NUMERALS 1 device for boring a non-round hole
10 processing head
11, 21 arbor (first rotating shaft)
12, 22 shaft (second rotating shaft)
13 cutting bit (processing tool)
23 arbor motor (first drive means)
24 shaft motor (second drive means)
40 control device (control means)
42 synchronization controller (synthetic bore shape map generation means, error parameter calculation means, processing tool control means)
51 roundness measuring instrument (bore shape data acquisition means)
52 host computer (analytical bore shape parameter calculation means, analytical bore shape parameter storage means, Bode diagram storage means)
60 cylinder block
60A cylinder block
61 bore
61A bore
70 dummy head
121 to 125 cam
241 second rotary encoder (second detection means)
252 first rotary encoder (first detection means)
M1 to M4 measurement point

PREFERRED MODE FOR CARRYING OUT THE INVENTION

Each embodiment of the present invention will be explained hereinafter based on the drawings.
First Embodiment FIG. 1 is a schematic configuration diagram of a device for boring a non-round hole 1 according to a first embodiment of the present invention.

The device for boring a non-round hole 1 inserts a processing head 10 into a work (e.g., bore of a cylinder block of an automotive engine), and performs boring processing and honing processing.

This device for boring a non-round hole 1 includes a rotary drive mechanism 20 that causes the processing head 10 to rotate, an advance/retract mechanism 30 that causes this rotary drive mechanism 20 to advance or retract, and a control device 40 as a control means that controls these.

The rotary drive mechanism 20 includes an arbor 21 of a cylindrical shape as a first rotating shaft, a shaft 22 that is stored inside of the arbor 21 as a second rotating shaft, an arbor motor 23 as a first drive means that rotationally drives the arbor 21, a shaft motor 24 as a second drive means that rotationally drives the shaft 22, and a housing 25 that accommodates the arbor motor 23.

Herein, the rotational axis of the arbor 21 and the rotational axis of the shaft 22 are the same axis.

In addition to the arbor motor 23, a bearing 251 that retains the arbor 21 to be rotatable, and a first rotary encoder 252 as a first detection means that detects the rotation angle and rotation amount of the arbor 21 are provided in the housing 25.

A second rotary encoder 241 as a second detection means that detects the rotation angle and rotation amount of the shaft 22 is provided to the shaft motor 24.

The advance/retract mechanism 30 is a feed screw mechanism, and includes a shaft portion 31 in which threads are cut, an advance/retract motor 32 that rotationally drives this shaft portion 31, and a third rotary encoder 33 that detects a rotation amount of the shaft portion 31. The shaft portion 31 is threaded into the housing 25 of the rotary drive mechanism 20.

According to this advance/retract mechanism 30, the shaft portion 31 rotates by driving the advance/retract motor 32, and the rotary drive mechanism 20 can be made to advance and retract.

The processing head 10 includes an arbor 11 of a cylindrical shape as a first rotating shaft that is integrally coupled to the arbor 21, a shaft 12 as a second rotating shaft that is stored inside the arbor 11 and integrally coupled to the shaft 22, and a cutting bit 13 and honing stones 14A and 14B as processing tools provided to a circumferential face of the arbor 11 to be able to project and retract.

A through-hole 111 is formed in the tip-end side of the arbor 11, and a pair of through-holes 112 and 113 is formed more towards a base-end side of the arbor 11 than the through-hole 111. Furthermore, through-holes 114 and 115 are formed on opposite sides to the pair of through-holes 112 and 113 of the arbor 11. These through-holes 111 to 115 extend in directions intersecting the rotational axis of the arbor 11.

The cutting bit 13 is rod shaped, is inserted in the through-hole 111, and is biased toward the shaft 12 by a biasing means, which is not illustrated.

The honing stones 14A and 14B respectively include a grindstone portion 141 that extends along the rotational axis of the arbor 11, and a Pair of neck portions 142 of rod shape provided to this grindstone portion 141. The pairs of neck portions 142 of the honing stones 14A and 14B are inserted in the through-holes 112 to 115, and are biased towards the shaft 12 by a biasing means, which is not illustrated.

A cam 121 that presses the cutting bit 13 in a projecting direction, cams 122 and 123 that press the honing stone 14A in a projecting direction, and cams 124 and 125 that press the honing stone 14B in a projecting direction are provided to the shaft 12.

Figure 2A:
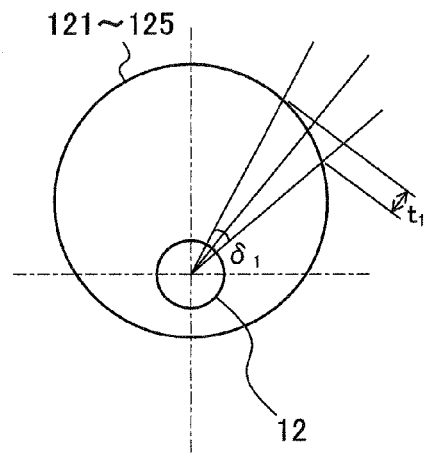
FIG. 2 is a view showing shapes of cams of the device for boring a non-round hole according to the embodiment.

The cams 121 to 125 are the circular shape shown in FIG. 2A, and the shaft 12 passes through a position shifted from the center of this circle shape. With this, the distance from the shaft 12 to the peripheral end of the cams 121 to 125 continually changes. For example, if the angle is caused to rotate by $\delta_1$ as shown in FIG. 2A, the distance from the shaft 12 to the peripheral end of the cams 121 to 124 changes by $t_1$.

Figure 2B:
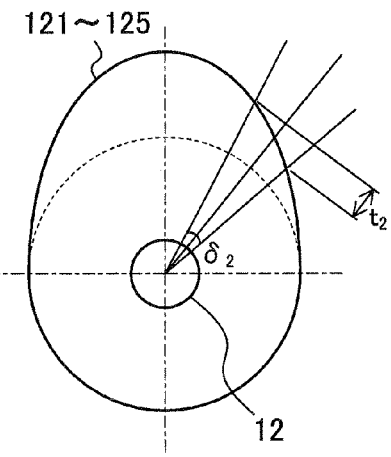

It should be noted that, although the cams 121 to 125 are made in the shape shown in FIG. 2A in the present embodiment, it is not limited thereto, and may be made in the shape shown in FIG. 2B.

In other words, a portion on a lower side from the position of the shaft 12 may be made a semicircular shape, and a portion on an upper side from the position of the shaft 12 may be made a shape halving an elliptical shape. With this, the distance from the shaft 12 to the peripheral end of the cams 121 to 125 continually changes by the portion on the upper side from the position of the shaft 12. For example, when the angle is made to rotate by $\delta_2$ as shown in FIG. 2B, the distance from the shaft 12 to the peripheral end of the cams 121 to 125 changes by $t_2$.

Among the aforementioned cams 121 to 125, the cam 122 and the cam 123, which press the honing stone 14A, are the same phase. In addition, the cam 124 and the cam 125, which press the honing stone 14B, are also in the same phase.

The base-end edge of the cutting bit 13 and the base-end edges of the neck portions 142 of the honing stones 14A and 14B abut the peripheral end of these cams 121 to 125.

Therefore, by causing the angle of the shaft 12 to change relative to the arbor 11, the portions of the peripheral end of the cams 121 to 125 abutting the cutting bit 13 and neck portions 142 of the honing stones 14A and 14B change, and thus the projecting amounts of the cutting bit 13 and honing stones 14A and 14B from the outer-circumferential face of the arbor 11 change.

Returning to FIG. 1, the control device 40 includes a main control device 41, synchronization controller 42, first servo amp 43, second servo amp 44, and third servo amp 45.

The main control device 41 drives the arbor motor 23 and advance/retract motor 32 via the first servo amp 43 and third servo amp 45, and controls the relative positions of the cutting bit 13 and honing stones 14A and 14B relative to the work. In addition, it drives the shaft motor 24 via the synchronization controller 42 and second servo amp 44 according to this relative position, and adjusts the projecting dimensions of the cutting bit 13 and honing stones 14A and 14B.

The synchronization controller 42 causes the movement of the shaft motor 24 to be synchronized with the movement of the arbor motor 23 and advance/retract motor 32. In other words, the synchronization controller 42 drives the shaft motor 24 via the second servo amp 44 based on the rotation angle and rotation amount of the arbor 21 detected by the first rotary encoder 252, as well as the rotation amount of the shaft portion 31 detected by the third rotary encoder. At this time, the shaft motor 24 is feedback controlled using the second servo amp 44 according to the rotation angle of the shaft 22 detected by the second rotary encoder 241.

The aforementioned control device 40 adjusts the projecting amounts of the cutting bit 13 and the honing stones 14A and 14B from the outer-circumferential face of the arbor 11 by causing the arbor 21 and the shaft 22 to synchronously rotate, while advancing or retarding the phase of the rotation angle of the shaft 22 relative to the phase of the rotation angle of the arbor 21.

A case of processing a work in a substantially square-shaped cross section by the device for boring a non-round hole 1 will be explained hereinafter while referring to FIGS. 3 and 4.

Figure 3:
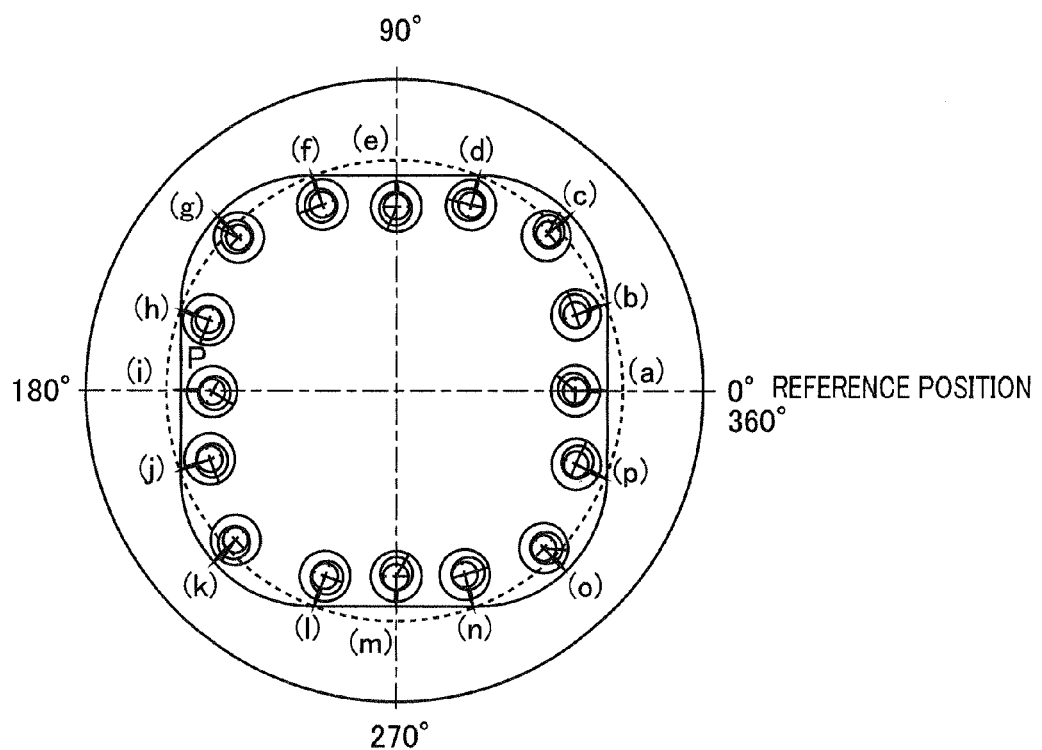
FIG. 3 is a view showing a relationship between a machining position of the device for boring a non-round hole and a projecting amount of a cutting bit according to the embodiment.

FIG. 3 is a view showing a relationship between a machining position and a projecting amount of the cutting bit 13.

In FIG. 3, the solid line is the interior wall surface of the work in a case of processing the work into a substantially square-shaped cross section, and the dotted line is the interior wall surface in a case of processing the work into a circular cross section.

As shown in FIG. 3, the projecting amount of the bit is made small at the portions corresponding to the center of each side configuring the substantially square shape of the work. On the other hand, the projecting amount of the bit is made large at the portions making the corners of the substantially square shape.

In other words, if representing the machining position by the rotational angle from a reference position, the projecting amount of the bit increases with the rotation angle approaching 45° from 0°, and the projecting amount of the bit decreases with the rotation angle approaching 90° from 45°.

Next, the projecting amount of the bit increases with the rotation angle approaching 135° from 90°, and the projecting amount of the bit decreases with the rotation angle approaching 180° from 135°.

Next, the projecting amount of the bit increases with the rotation angle approaching 225° from 180°, and the projecting amount of the bit decreases with the rotation angle approaching 270° from 225°.

Then, the projecting amount of the bit increases with the rotation angle approaching 315° from 270°, and the projecting amount of the bit decreases with the rotation angle approaching 360° from 315°.

Figure 4A:
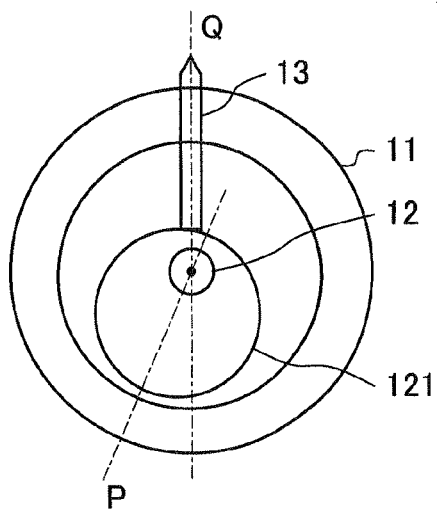
FIG. 4 is a view showing a relative position relationship between the cutting bit and the cam at machining positions of the device for boring a non-round hole according to the embodiment.
Figure 4B:
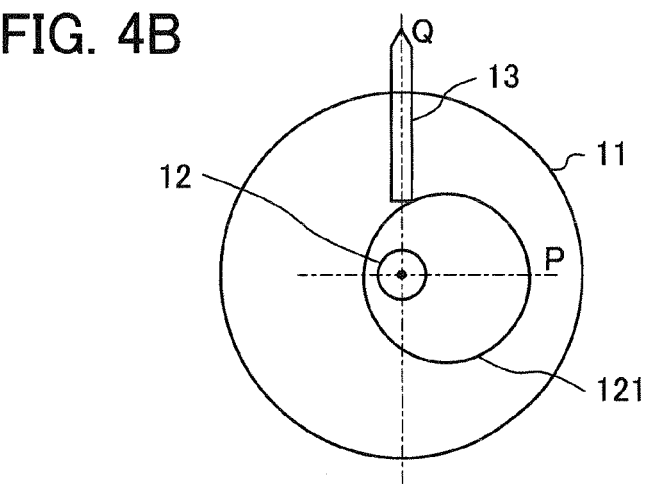
Figure 4C:
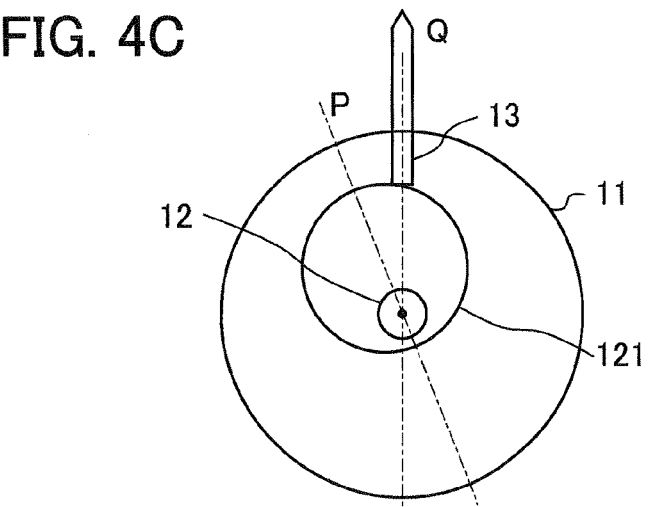

Assuming the machining positions (a) to (p) corresponding to the aforementioned rotation angles 0° to 360°, the relative positions of the cutting bit 13 and the cam 121 at each machining position are as shown in FIGS. 4A to 4C.

It should be noted the straight line, which passes through the shaft 12 and the farthest portion from the shaft 12 on the peripheral end of the cam 121, is set as a reference line P of the cam for the cam 121. On the other hand, the straight line that passes through the central axis of the cutting bit is set as a reference line Q of the cutting bit.

At the machining positions (a), (e), (i), and (m), the angle formed by the reference angle P of the cam and the reference line Q of the cutting bit is an obtuse angle, as shown in FIG. 4A.

At the machining positions (b), (d), (f), (h), (j), (l), (n), and (p), the angle formed by the reference angle P of the cam and the reference line Q of the cutting bit is a right angle, as shown in FIG. 4B.

At the machining positions (c), (g), (k), and (o), the angle formed by the reference line P of the cam and the reference line Q of the cutting bit is an acute angle, as shown in FIG. 4C.

It should be noted that the angles formed by the reference line P of the cam and the reference line Q of the cutting bit are illustrated to be greatly exaggerated in FIG. 3 and FIGS. 4A to 4C in order to facilitate understanding; however, the angle formed by the reference line P of the cam and the reference line Q of the cutting bit changes within a range on the order of 0° to 5° in actuality.

Next, a sequence of boring processing a bore of a cylinder block of an automotive engine as a work using the device for boring a non-round hole 1 configured as described above will be explained while referring to the flowchart of FIG. 5.

Figure 6A:
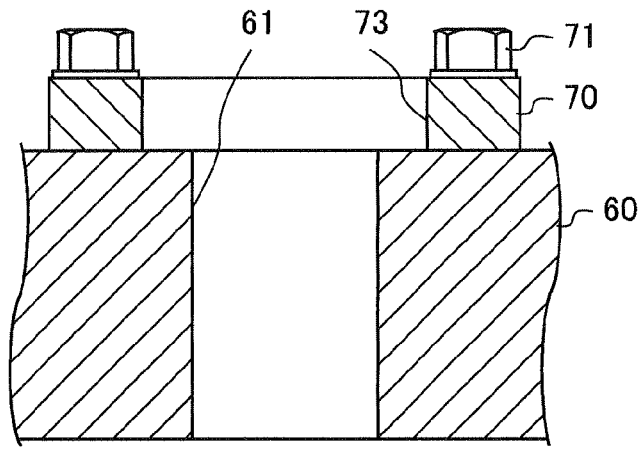
FIG. 6 is a cross-sectional view showing a cylinder block that is boring processed using the device for boring a non-round hole according to the embodiment.

First, in Step S1, a dummy head 70 is mounted to a cylinder block 60, which is a bare cylinder block, by bolts 71, as shown in FIG. 6A. The dummy head 70 is made in a shape and of a material replicating a finished cylinder head, and has hole portions 73 of a larger diameter than the bore 61 of the cylinder block 60 formed therein.

Next, in Step S2, the cylinder block 60 is arranged at a fixed position, and the bore 61 is processed to a desired roundness (shape) with the cutting bit 13 by the device for boring a non-round hole 1, under the control of the control device 40.

Figure 6B:
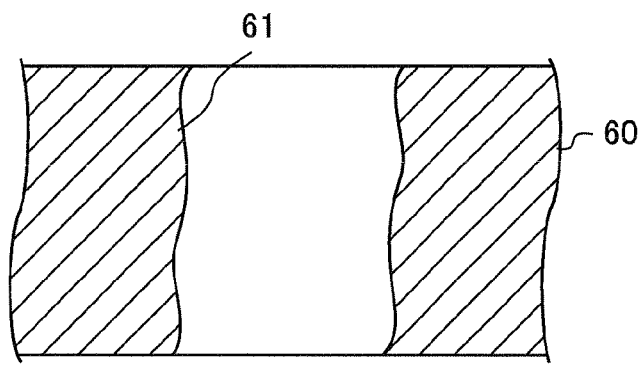

Then, in Step S3, the dummy head 70 is detached from the cylinder block 60. When this is done, the inner-diameter of the bore 61 of the cylinder block 60 deforms somewhat from the state in FIG. 6A, as shown in FIG. 6B. This is because the stress from mating the dummy head 70 is released.

Therefore, in Step S4, after the dummy head 70 has been detached, the cylinder inner-diameter (bore diameter) at every axial position of the cylinder block 60 is measured, similarly to Step S3. This measurement data is stored in the synchronization controller 42 as inner-diameter data, for example.

In Step S5, NC data is created based on the inner-diameter data. The NC data prepared in this way is data created so that the cylinder inner-diameter (bore diameter) becomes a desired roundness when the dummy head 70 is mounted after boring processing of the bare cylinder block was performed without the dummy head 70 being mounted.

Next, in Step S6, the NC data thus created is input to the control device 40 of the device for boring a non-round hole 1.

Then, in Step S7, first, a cylinder block 60A, which is a new bare cylinder block different from the cylinder block 60 on which boring processing has already been performed, is arranged at a predetermined position. Next, boring processing conforming to the NC data thus input is conducted on the cylinder block 60A under the control of the control device 40.

Figure 7:
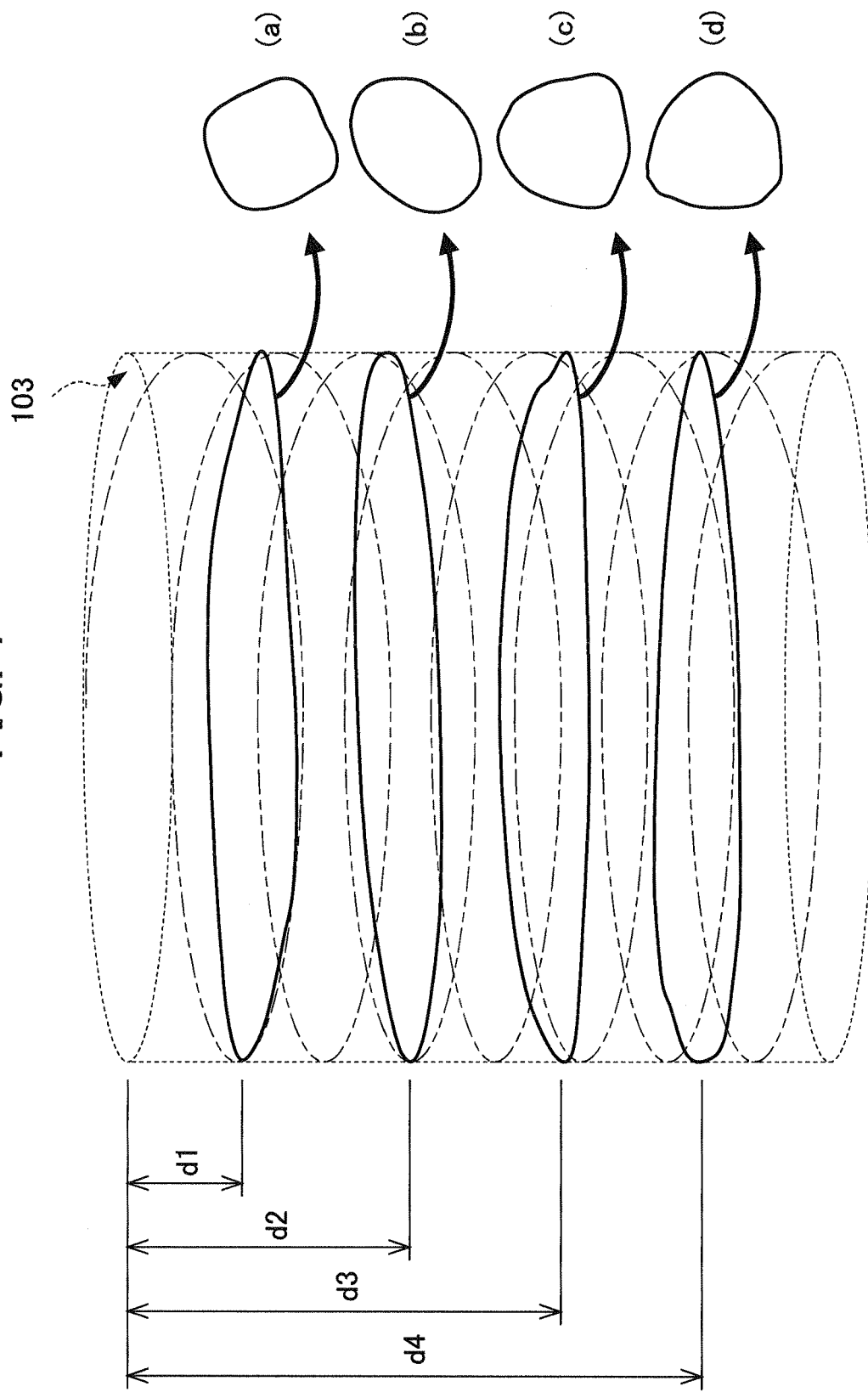
FIG. 7 is a perspective view showing a bore of a cylinder block that has been boring processed using the device for boring a non-round hole according to the embodiment.

In other words, by causing the cutting bit to move along the two-dot dashed line as shown in FIG. 7, a cross-sectional shape of the bore 61A at a position descending by d1 to d4 from the top edge of the work is made a shape conforming to the NC data, such as those shown in FIGS. 7(a) to (d), by the device for boring a non-round hole 1.

Figure 6C:
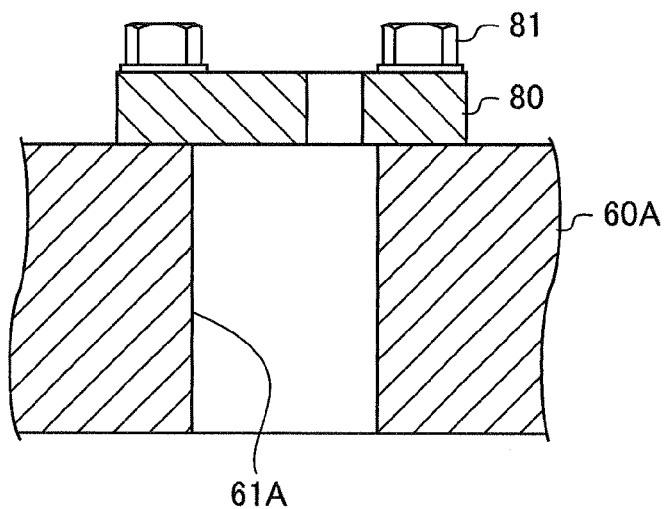

In Step S8, a finished cylinder head 80, which is different from the dummy head 70, to be used as the actual finished product is prepared, and the finished cylinder head 80 is mounted by bolts 81 to the new cylinder block 60A on which boring processing has been conducted, as shown in FIG. 6C.

When this is done, the cylinder inner-diameter (bore diameter) of the cylinder block 60A becomes the desired roundness.

According to the present embodiment, there is the following effect.

(1) The projecting dimension of the cutting bit 13 was adjusted by advancing or retarding the phase of the rotation angle of the shaft 12 relative to the phase of the rotation angle of the arbor 11, thereby generating a phase difference, and changing the pressing amount of the cam 121 against the cutting bit 13 according to this phase difference. Therefore, since all that is formed is the cam 121, a work can be processed at high speed to a desired cross-sectional shape by a simple configuration because a shaft is not caused to advance and retract as is conventionally.

Second Embodiment

Figure 8:
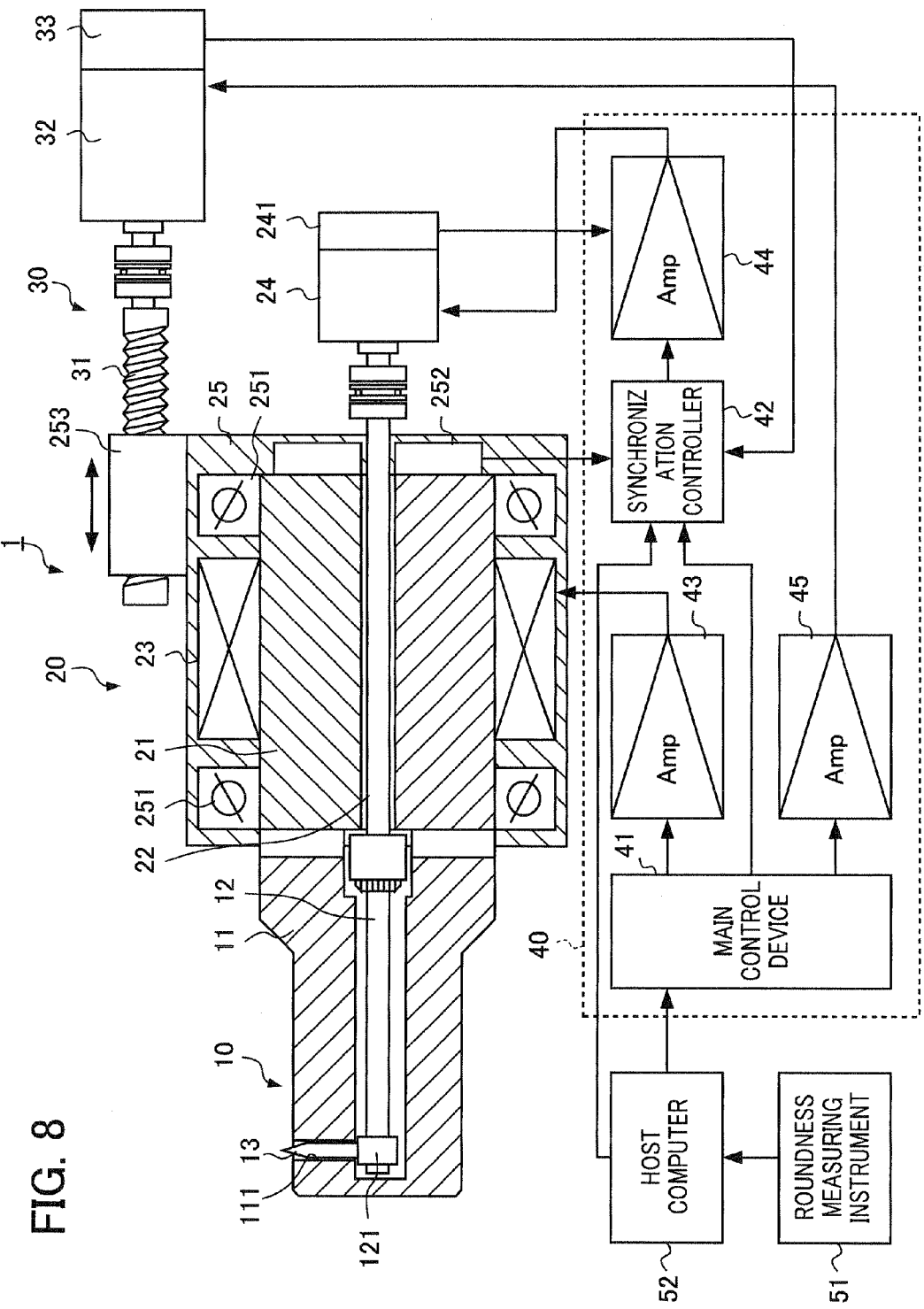
FIG. 8 is a schematic configuration diagram of a device for boring a non-round hole according to a second embodiment of the present invention.

FIG. 8 is a schematic configuration diagram of a device for boring a non-round hole 1 according to a second embodiment of the present invention.

The device for boring a non-round hole 1 inserts a processing head 10 into a bore of a cylinder block of an automotive engine as a work, for example, and performs boring processing.

This device for boring a non-round hole 1 includes a rotary drive mechanism 20 that causes the processing head 10 to rotate, an advance/retract mechanism 30 that causes this rotary drive mechanism 20 to advance or retract, a control device 40 that controls these, a roundness measuring instrument 51 that measures the inner-diameter shape of the bore of the work, and a host computer 52 that analyzes the measurement results of this roundness measuring instrument 51 and outputs to the control device 40.

The rotary drive mechanism 20 includes an arbor 21 of a cylindrical shape, a shaft 22 that is stored inside of the arbor 21, an arbor motor 23 that rotationally drives the arbor 21, a shaft motor 24 that rotationally drives the shaft 22, and a housing 25 that accommodates the arbor motor 23.

Herein, the rotational axis of the arbor 21 and the rotational axis of the shaft 22 are the same axis.

In addition to the arbor motor 23, a bearing 251 that retains the arbor 21 to be rotatable, a first rotary encoder 252 that detects the rotation speed and rotation angle of the arbor 21, and a nut portion 253 that is threaded with the advance/retract mechanism 30 are provided in the housing 25.

A second rotary encoder 241 that detects the rotation speed and rotation angle of the shaft 22 is provided to the shaft motor 24.

The advance/retract mechanism 30 is a feed screw mechanism, and includes a shaft portion 31 in which threads are cut, an advance/retract motor 32 that rotationally drives this shaft portion 31, and a third rotary encoder 33 that detects a rotation speed and rotation angle of the shaft portion 31. The shaft portion 31 is threaded into the nut portion 253 of the housing 25.

According to this advance/retract mechanism 30, the shaft portion 31 rotates by driving the advance/retract motor 32, and the rotary drive mechanism 20 can be made to advance and retract.

The processing head 10 includes an arbor 11 of a cylindrical shape that is integrally coupled to the arbor 21, a shaft 12 that is stored inside the arbor 11 and is integrally coupled to the shaft 22, and a cutting bit 13 provided to a circumferential face of the arbor 11 to be able to project and retract.

A through-hole 111 extending in a direction intersecting the rotational axis of the arbor 11 is formed in the tip end side of the arbor 11.

The cutting bit 13 is rod shaped, is inserted in the through-hole 111, and is biased toward the shaft 12 by a biasing means, which is not illustrated.

As shown in FIG. 9, a cam 121 that presses in a direction in which the cutting bit 13 projects is provided to the shaft 12.

The cam 121 is a perfect circle shape, for example, and the shaft 12 is provided at a position shifted from the center of this perfect circle. With this, the distance from the center of rotation of the shaft 12 to the peripheral end of the cam 121 continually changes.

It should be noted that the shape of the cam 121 is not limited to a perfect circle shape; however, a perfect circle shape is preferred due to decreasing cost.

A base-end edge of the cutting bit 13 abuts the peripheral end of this cam 121.

Therefore, by causing the angle of the shaft 12 to change relative to the arbor 11, the portion of the peripheral end of the cam 121 abutting the cutting bit 13 changes, and thus the projecting amount of the cutting bit 13 from the outer-circumferential face of the arbor 11 changes.

FIG. 9A is a schematic diagram showing a state in which the projecting amount of the cam 121 is t, and FIG. 9B is a schematic diagram showing a state in which the projecting amount of the cutting bit 13 is zero.

In FIG. 9, the straight line from the center of rotation of the cam 121 reaching a portion of the peripheral end of the cam 121 farthest from the shaft 12 is set as a reference line Q of the cam 121, and a straight line passing through the central axis of the cutting bit 13 is set as a reference line R of the cutting bit 13. Then, the angle formed between the reference line Q of the cam 121 and the reference line R of the cutting bit 13 is set as the cam angle.

In a state in which the projecting amount of the cutting bit 13 is t, the cam angle is $\alpha$. This $\alpha$ is set as an initial angle. On the other hand, in a state in which the projecting amount of the cutting bit 13 is zero, the cam angle is $(\alpha+\beta)$.

With the radius of the cam 121 as Cr, when the offset dimension from the center of the cam 121 to the center of rotation is set as Co, the maximum dimension L1 and minimum dimension L2 from the center of rotation of the cam 121 to the base end edge of the cutting bit 13 are represented by the following formulas (1) and (2).

$$L1 = Co \times \cos(\alpha) + Cr \quad (1)$$

$$L2 = Co \times \cos(\alpha+\beta) + Cr \quad (2)$$

In view of the above, the following formula (3) is established in which the stroke of the cam angle is β (oscillating angle), and the stroke of the projecting amount of the cutting bit 13 is t.

$$T = L1 - L2 = Co \times \{\cos(\alpha) - \cos(\alpha+\beta)\} \quad (3)$$

The relationship between the cam angle and the cutting bit projecting amount based on this formula (3) is shown in FIG. 10.

As shown by the solid line in FIG. 10, the projecting amount of the cutting bit 13 changes in non-linearly, i.e. in an arc shape, relative to the change in the cam angle. On the other hand, as shown by the dotted line in FIG. 10, with an ideal cam, the projecting amount of the cutting bit changes in a linear fashion (linearly). Therefore, compared to a case of causing the projecting amount of the cutting bit to change in a linear fashion (linearly), the error in the projecting amount of the cutting bit 13 is largest in the vicinity in the middle of the cam angle α (initial angle) and the cam angle (α+β).

Therefore, in a case of wanting to cause the cutting bit 13 to project by Δt, the cam angle (α+Δβ) corresponding to this projecting amount (Δt) is set as the command value of the cam angle. With this, the projecting amount can be easily caused to change in a linear fashion (linearly).

More specifically, a table correlating the projecting amount (Δt) with the command value of the cam angle (α+Δβ) is generated, is stored in advance in memory, and this command value (α+Δβ) is called out by a synchronization controller 42 described later.

Returning to FIG. 8, the control device 40 can adjust the projecting amount of the cutting bit 13 from the outer-circumferential face of the arbor 11 of the cutting bit 13 by causing the arbor 21 and the shaft 22 to synchronously rotate, while advancing or retarding the phase of the rotation angle of the shaft 22 relative to the phase of the rotation angle of the arbor 21.

This control device 40 includes a main control device 41, synchronization controller 42, first servo amp 43, second servo amp 44, and third servo amp 45.

The main control device 41 drives the arbor motor 23 and the advance/retract motor 32 via the first servo amp 43 and the third servo amp 45 according to the output from the host computer, and controls the machining speed and the position on the axis of the cutting bit 13 on the work. In other words, the main control device 41 is a device that performs the same operation as a so-called NC (numerical) control device.

The synchronization controller 42 outputs a command signal in response to the orientation of the cutting bit 13 relative the bore of the work (i.e. rotation angle of the arbor 21) and the position on the axis of the cutting bit 13 relative to the bore of the work (i.e. rotation angle of the shaft portion 31 of the advance/retract mechanism 30). With this, the shaft motor 24 is driven via the second servo amp 44, and the projecting dimension of the cutting bit 13 (i.e. projecting amount of the cutting bit 13 from the outer-circumferential face of the arbor 11) is adjusted.

More specifically, a map showing the relationship between the rotation angle of the arbor 21 and the position in an advance/retract direction of the processing head 10 (i.e. position on the axis of the cutting bit 13 relative to the bore of the work), the projecting amount of the cutting bit 13 is generated based on the output from the host computer, and this map is stored by the synchronization controller 42 in memory inside the synchronization controller 42.

The map is a map in which parameters are arranged. In other words, the aforementioned map is a map in which two-dimensional cross-sectional data of a bore showing the relationship between the rotation angle of the arbor 21 and the projecting amount the cutting bit 13 at every position in the advance/retract direction of the processing head 10 (i.e. position of the cutting bit 13 on the axis relative to the bore of the work) is obtained and arranged in the axial direction.

Then, the synchronization controller 42 drives the shaft motor 24 via the second servo amp 44 while referring to the map stored in memory inside the synchronization controller 42 and showing the relationship of the projecting amount of the cutting bit 13, based on the revolution speed and rotation angle of the arbor 21 detected by the first rotary encoder 252 (more specifically, a pulse number generated by the rotary encoder per unit time, i.e. pulse number of a sampling time), as well as the rotation angle of the shaft portion 31 detected by the third rotary encoder (more specifically, a pulse number generated by the rotary encoder per unit time, i.e. pulse number of a sampling time).

At this time, the shaft motor 24 is feedback controlled by the second servo amp 44 in response to the revolution speed and rotation angle of the shaft 22 detected by the second rotary encoder 241 (more specifically, a pulse number generated by the rotary encoder per unit time, i.e. pulse number of a sampling time).

Control of the shaft 22 by the above synchronization controller 42 will be explained while referring to FIG. 11.

Figure 11:
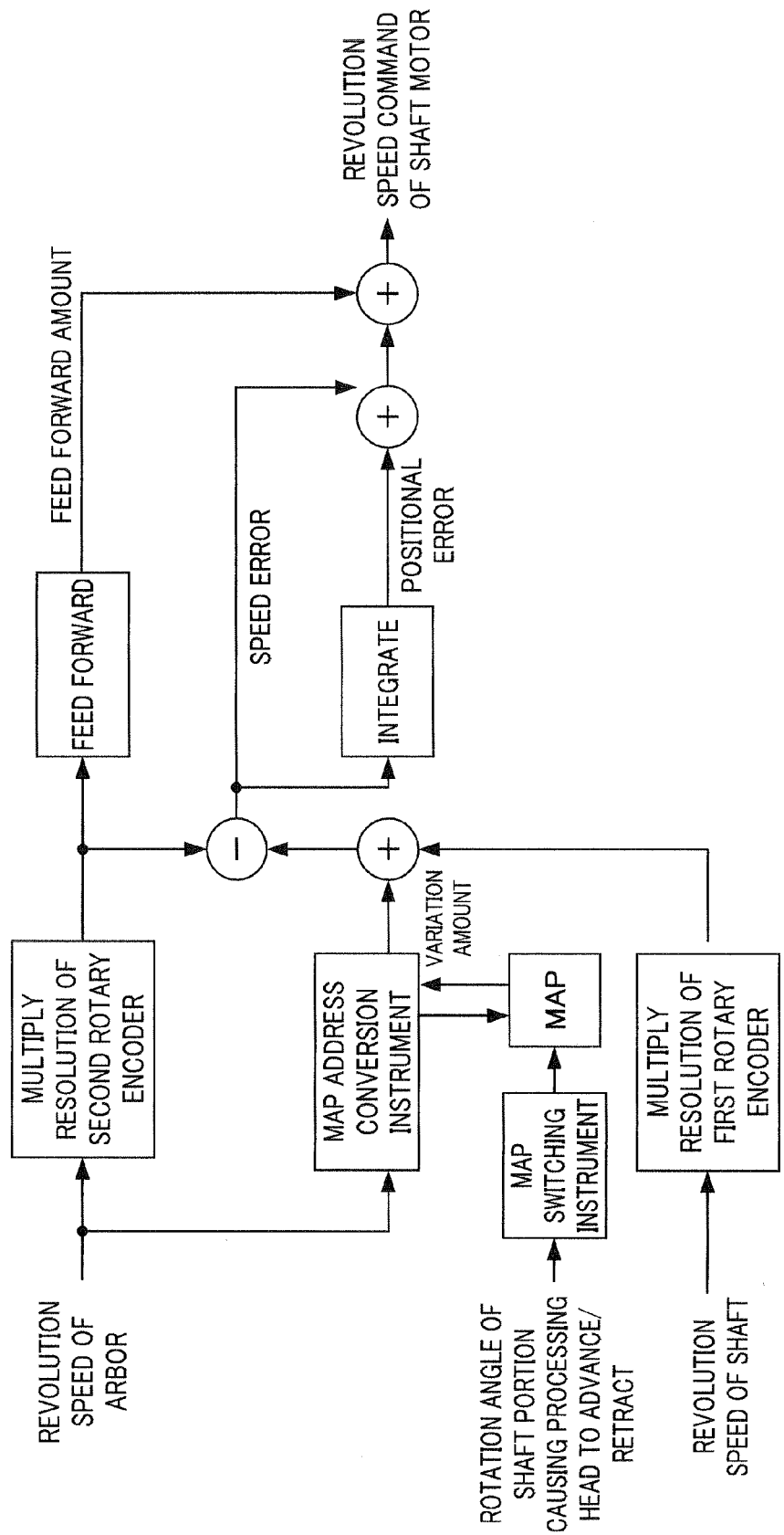
FIG. 11 is a block diagram showing operations of a synchronization controller of the device for boring a non-round hole according to the embodiment.

FIG. 11 is a block diagram showing operations of the synchronization controller 42.

In a case of making the arbor 21 and shaft 22 to be perfectly synchronized, first, the resolution (PG2) of the second rotary encoder 241 detecting the revolution speed of the shaft 22 is multiplied by the revolution speed of the arbor 21, the resolution (PG1) of the first rotary encoder 252 detecting the revolution speed of the arbor 21 is multiplied by the revolution speed of the shaft 22, and the difference of both is calculated.

Since the resolution (PG1) of the first rotary encoder 252 and the resolution (PG2) of the second rotary encoder 241 are different, such multiplication was performed because the resolutions are made to match by taking the ratio of these resolutions into account.

Next, the difference thus calculated is calculated as a speed error, and this speed error is integrated and set as a position error.

Then, a feed forward amount is calculated from the revolution speed of the arbor 21, the speed error and the position error are added thereto, and set as a speed command to the shaft motor 24.

When this is done, a phase difference between the arbor and cam is maintained, and the projecting amount of the cutting bit 13 is made constant.

On the other hand, in a case of the phases between the arbor 21 and the shaft 22 shifting, first, when the rotation angle of the shaft portion 31 causing the processing head 10 to advance or retract is acquired, the position of the processing head 10 in the advance/retract direction (i.e. position of the cutting bit 13 on an axis relative to the bore) is calculated by the control device, and the map showing a relationship of the rotation angle of the aforementioned arbor 21 and the projecting amount of the cutting bit 13 (two-dimensional cross-sectional data of bore) is switched in a map switching instrument according to the position of the processing head 10 in the advance/retract direction thus calculated.

In addition, a map address conversion instrument obtains the rotation position of the arbor 21 upon acquiring the revolution speed and rotation angle of the arbor 21.

Then, the map address conversion instrument refers to the aforementioned map, calls out projecting amount data of the cutting head 13 according to the rotation angle of the arbor 21 to extract a difference from previous data, and adds this difference to a revolution speed command of the shaft motor 24 as an amount of change (i.e. speed).

Figure 12:
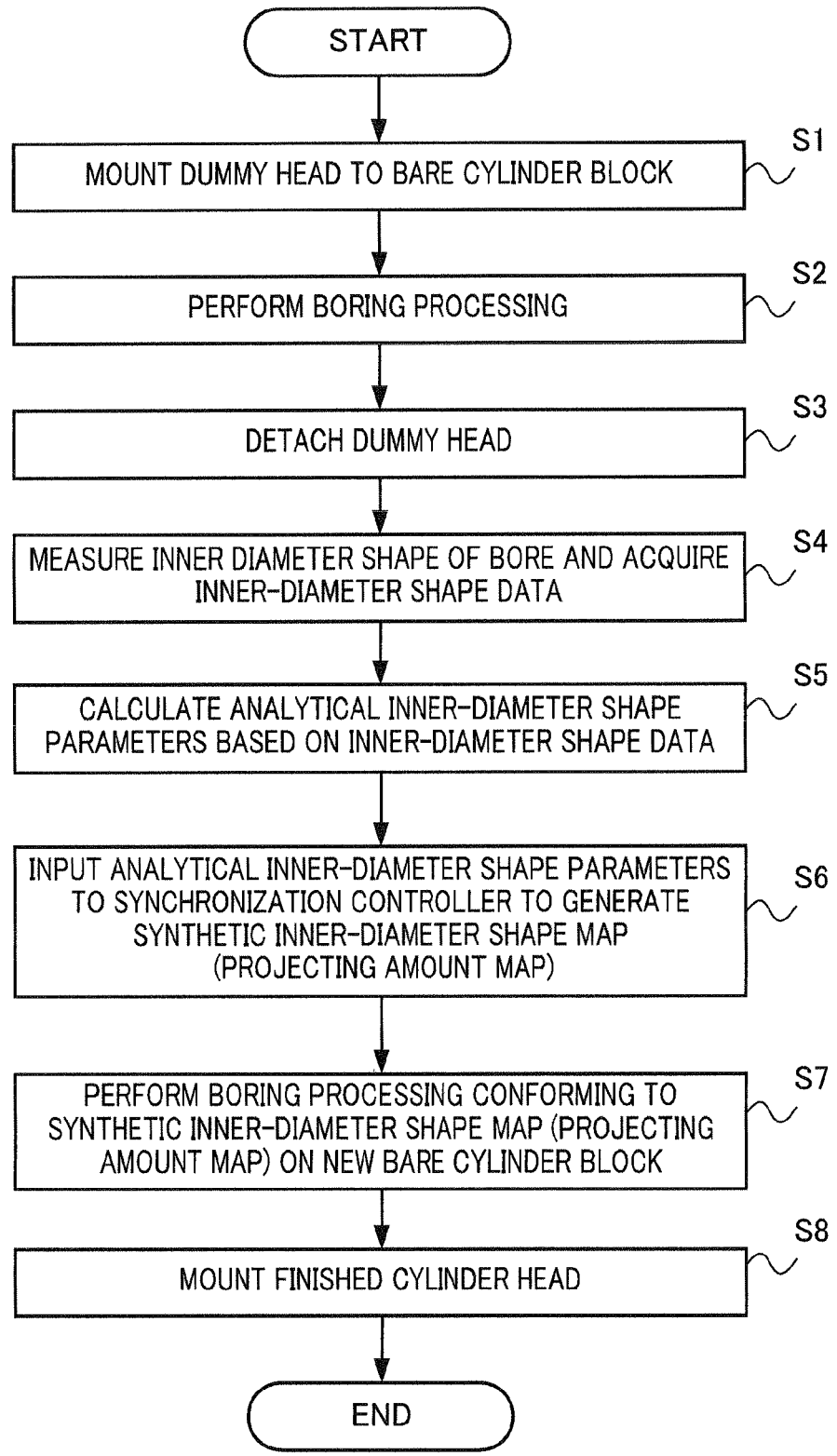
FIG. 12 is a flowchart showing a sequence of boring processing a bore of a cylinder block using the device for boring a non-round hole according to the embodiment.

Next, a sequence of conducting boring processing a bore of a cylinder block of an automotive engine using the device for boring a non-round hole 1 configured as described above will be explained while referring to the flowchart of FIG. 12.

Figure 13A:
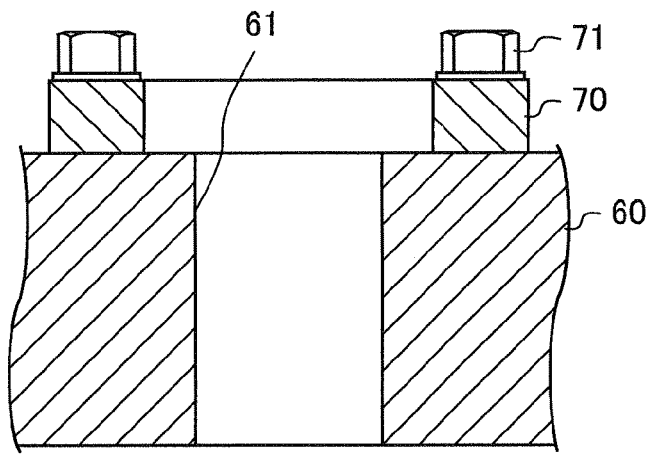
FIG. 13 is a cross-sectional diagram showing a cylinder block that is boring processed using the device for boring a non-round hole according to the embodiment.

First, in Step S1, the dummy head 70 is mounted to the cylinder block 60, which is a bare cylinder block, by the bolts 71, as shown in FIG. 13A. The dummy head 70 is made in a shape and of a material replicating a finished cylinder head, and has holes into which the processing head 10 of the device for boring a non-round hole 1 can be inserted formed in a center portion thereof.

Next, in Step S2, the cylinder block 60 is arranged at a predetermined position, and the bore 61 is processed to a desired roundness by the device for boring a non-round hole 1.

Figure 13B:
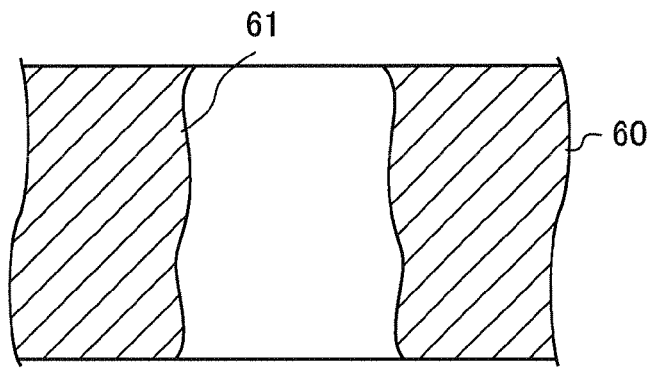

Then, in Step S3, the fastening of the bolts 71 is released and the dummy head 70 is detached from the cylinder block 60. When this is done, the inner-diameter of the bore 61 of the cylinder block 60 deforms somewhat from the state in FIG. 13A, as shown in FIG. 13B. This is because the stress from mating the dummy head 70 is released.

Figure 14A:
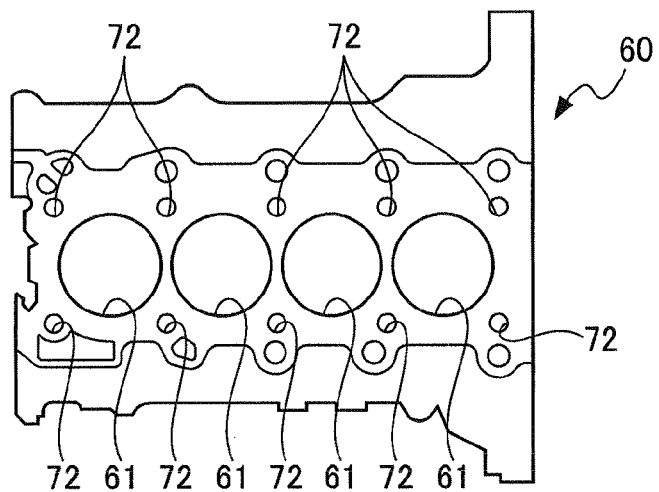
FIG. 14 is a view for illustrating states in which the cylinder block according to the embodiment is deformed.

More specifically, as shown in FIG. 14A, four of the bores 61 are formed to be aligned on a straight line in the cylinder block 60. Bolts holes 72 in which the bolts 71 are threaded are formed around each of the bores 61.

Figure 14B:
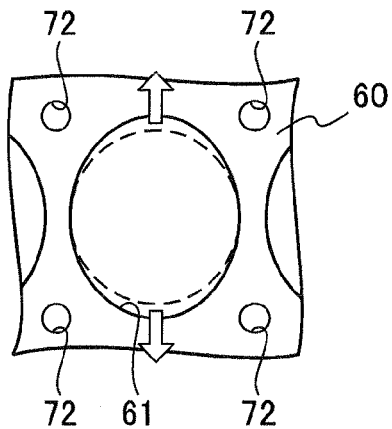
Figure 14C:
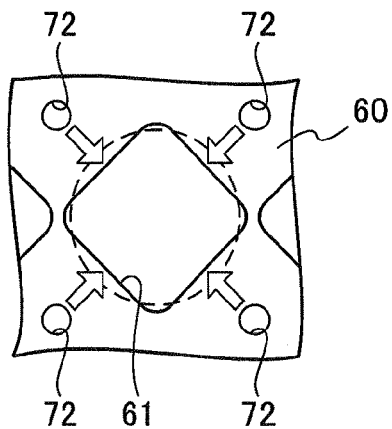

When the dummy head 70 is removed from the cylinder block 60, the inner-diameter shape on a dummy-head side of the bore 61 deforms to an elliptical shape as shown in FIG. 14B, since the pressure from the dummy head 70 is eliminated. In addition, since the stress acting between the threads of the bolt hole 72 and the threads of the bolt 71 is eliminated, the inner-diameter shape on a crank-shaft side of the bore 61 deforms to a square shape as shown in FIG. 14C.

Therefore, an example of performing frequency analysis up to $4^{th}$ order in the step of performing frequency analysis on the inner-diameter shape of the bore is described hereinafter. This is because the deformation of the bore of the cylinder block can be approximately reproduced if it is frequency analyzed up to $4^{th}$ order.

In other words, the $4^{th}$ order component represents the component of a square shape, the $3^{rd}$ order component represents a component of triangular shape, and the $2^{nd}$ order component represents a component of elliptical shape; therefore, the deformation of the bore of the cylinder block can be reproduced and high-order noise can be eliminated by performing frequency analysis from $0^{th}$ order to $4^{th}$ order to express in cosine waves, and synthesizing these cosine waves.

In addition, if the cross-sectional two-dimensional shape $(X_I, Y_I)$ is stored as a point group $(X_I, Y_I)$ in a normal NC data format, the data volume will be enormous; however, by storing in a curve data format using the cosine waves as in the present invention, the data volume can be considerably decreased and data processing can be accelerated.

In other words, frequency analysis from $0^{th}$ order to $4^{th}$ order can be performed in forming a hole of a non-round cross-sectional shape so as to eliminate deformation in the bores of a cylinder block when mating a cylinder head to the cylinder block, resulting in the data volume also being reduced.

It should be noted that, although an example of up to $4^{th}$ order frequency analysis has been shown in the present embodiment, it may be $50^{th}$ order, $100^{th}$ order, or even higher order depending on the shape of the hole. For example, although 720 parameters are required in a case of expressing one circumferential portion of the shape of a hole of a non-round cross-sectional shape at every 1° by a normal NC data format, in a case of expressing by $50^{th}$ order curve data format, 101 parameters are sufficient. Specifically, they are indicative of the radial error ($0^{th}$ order), 50 $n^{th}$ amplitudes and 50 $n^{th}$ order phases. In this way, the data volume can be decreased and data processing can be accelerated even if executing frequency analysis up to the $50^{th}$ order, by storing in curve data format.

Then, in Step S4, the inner-diameter shape is measured at predetermined intervals on the axis of the bore 61 of the cylinder block 60 after having removed the dummy head 70, and is stored as inner-diameter shape data in the host computer 52.

In Step S5, frequency analysis is performed based on the inner-diameter shape data, and analytical inner-diameter shape parameters are calculated.

Next, in Step S6, the analytical inner-diameter shape parameters thus calculated are input to the synchronization controller 42 of the device for boring a non-round hole 1, and a synthetic inner-diameter shape map is generated.

Then, in Step S7, first, a cylinder block 60A, which is a new bare cylinder block different from the cylinder block 60 on which boring processing had already been performed, is arranged at a predetermined position. Next, under the control of the synchronization controller 42, boring processing is conducted on the cylinder head 60A based on the synthetic inner-diameter shape map thus generated.

Figure 13C:
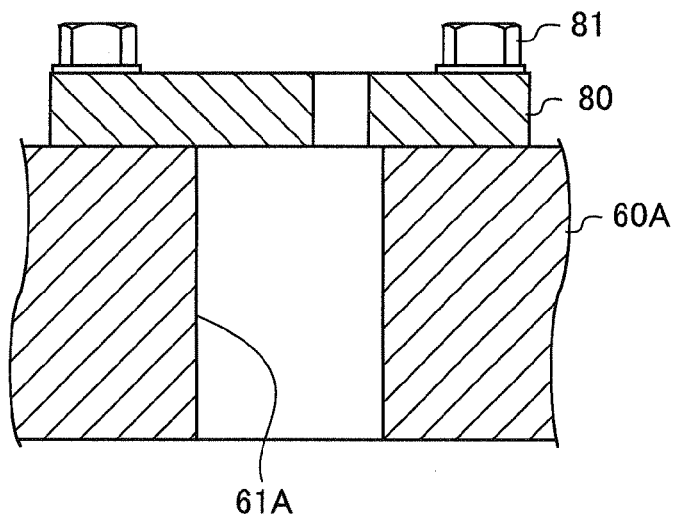

In Step S8, a finished cylinder head 80, which is different from the dummy head 70, to be used as the actual finished product is prepared, and the finished cylinder head 80 is mounted by bolts 81 to the new cylinder block 60A on which boring processing has been conducted, as shown in FIG. 13C. When this is done, the inner-diameter shape of a bore 61A of the cylinder block 60A becomes the same roundness as the bore 61 of the cylinder block 60.

Next, a detailed sequence from measurement of the bore inner-diameter shape in the aforementioned Step S4 to boring processing in Step S7 will be explained while referring to the flowchart of FIG. 15.

In Step S11 (S4), for example, for every cylinder, the four measurement points of M1 to M4 are set every predetermined interval on the axis of the bore by a roundness measuring instrument 51, and the inner-diameter shape of the bores are measured at each measurement point M1 to M4.

More specifically, for every cylinder, a sensor such as an air micrometer, proximity sensor and laser sensor is inserted in the bore and is moved along an axis while rotating to measure the inner-diameter shape of the bore at each measurement point, which is then set as inner-diameter shape data.

It should be noted that, although an example of measuring at predetermined intervals was exemplified, irregular intervals may be measured, e.g., a number of locations on a cylinder-head side of the cylinder block, or conversely, a number of locations on a crank-shaft side of the cylinder block.

Figure 16:
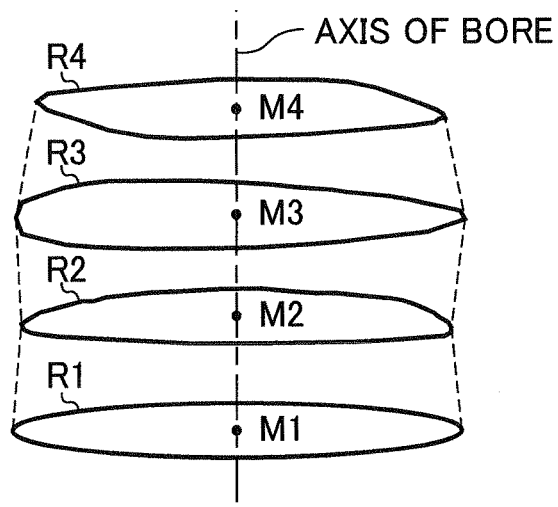
FIG. 16 is a schematic diagram showing the inner-diameter shape of a bore measured at measurement points of the cylinder block according to the embodiment.

FIG. 16 is a schematic diagram showing inner-diameter shapes R1 to R4 of a bore measured at each measurement point of M1 to M4.

As shown in FIG. 16, the inner-diameter shapes R1 to R4 of the bore at each measurement point M1 to M4 are mutually different, and become a non-round shape such as an elliptical shape, triangular shape, square shape, eccentric circle, or the like.

Figure 17:
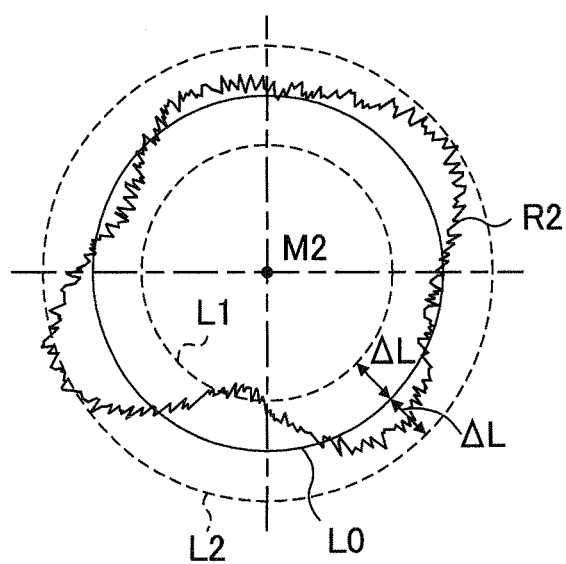
FIG. 17 is a cross-sectional diagram showing an inner-diameter shape of a bore measured at one measurement point of the cylinder block according to the embodiment.
Figure 18:
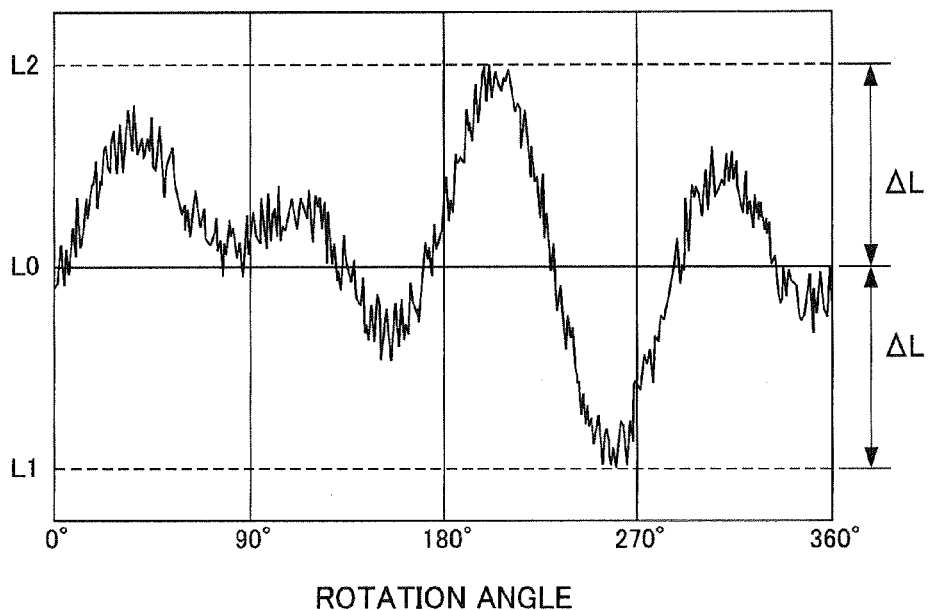
FIG. 18 is a graph representing an inner-diameter shape of a bore measured at one measurement point of the cylinder block, with the rotational axis as the horizontal axis, according to the embodiment.

FIG. 17 is a cross-sectional view showing an inner-diameter shape R2 of a bore measured at one among the measurement points M1 to M4: at the measurement point M2 herein. FIG. 18 is a graph representing the inner-diameter shape R2 of the bore in FIG. 17 with the rotation angle as the horizontal axis.

In FIGS. 17 and 18, the position on the inner-circumferential surface of the bore in a case of the deformation amount of the bore being set to zero is set to the reference line L0, a more inward side by ΔL than this reference line L0 is set as L1, and a more outward side by ΔL than the reference line L0 is set as L2.

As shown in FIGS. 17 and 18, it is understood that there are peaks and valleys of ΔL extent as well as high order noise included in the inner-diameter shape of the bore measured.

In Step S12, the host computer 52 extracts $n^{th}$ order components of error relative to a perfect circle by performing frequency analysis on the inner-diameter shape of the bore at each measurement point of M1 to M4, and obtains the amplitude and phase of each to generate analytical inner-diameter shape parameters $(A_n, P_n)$ for the amplitude and phase.

More specifically, following the below formulas (4) to (7), the projecting amount from the reference line L0 is represented by a function $x(\theta)$ of angle θ, and Fourier transformation is performed according to the following formulas to obtain the amplitude $A_n$ and phase $P_n$ of the $n^{th}$ order component.

Herein, the amplitude $A_o$ represents the error in the radius relative to a perfect circle, which is the reference line, the amplitude $A_1$ represents eccentricity from a perfect circle, which is the reference line, the amplitude $A_2$ represents a component of an elliptical shape, the amplitude $A_3$ represents a component of a triangular shape, and the amplitude $A_4$ represents a component of a square shape. In addition, $P_o$ is not required.

$$Icn = \frac{1}{2\pi} \int_0^{2\pi} x(\theta)\cos(n\theta)d\theta \quad (4)$$

$$Isn = \frac{1}{2\pi} \int_0^{2\pi} x(\theta)\sin(n\theta)d\theta \quad (5)$$

$$An = 2(Icn^2 + Isn^2)^{1/2} \quad (6)$$

$$Pn = \tan^{-1}(Icn/Isn) \quad (7)$$

Inverse Fourier transformation is performed on these analytical inner-diameter shape parameters $(A_n, P_n)$ of the $n^{th}$ component, and when the projecting amount from the reference line L0 is expressed by a function $T(\theta)$ of the angle θ, it becomes formula (8).

$$T\theta = -(A_0 + A_1\cos(\theta + P_1) + A_2\cos(2\theta + P_2) + \quad (8)$$
$$A_3\cos(3\theta + P_3) + \ldots + A_k\cos(k\theta + P_k))$$
$$= -\left(A_0 + \sum_{n=1}^{k} A_1\cos(n\theta + P_n)\right)$$

Next, the k value in formula (8) is obtained in the following sequence according to the Bode diagram of the device for forming a non-round hole 1 shown in FIG. 19).

This Bode diagram shows characteristics due to the torsional stiffness from the shaft motor 24 to the tip end of the cutting bit 13, and is prepared in the following sequence.

Specifically, a sine wave signal of a constant frequency and amplitude is supplied to the shaft motor 24. Then, the rotation angle of a base-end side of the shaft 22 is detected by the second rotary encoder 241, and the displacement of the tip end of the cutting bit 13 is detected by a sensor not illustrated. Fourier transformation is performed on these two outputs, and then the amplitude ratio and phase difference of the tip-end side of the cutting bit 13 relative to the shaft motor 24 is obtained for each frequency component, and plotted.

Figure 19:
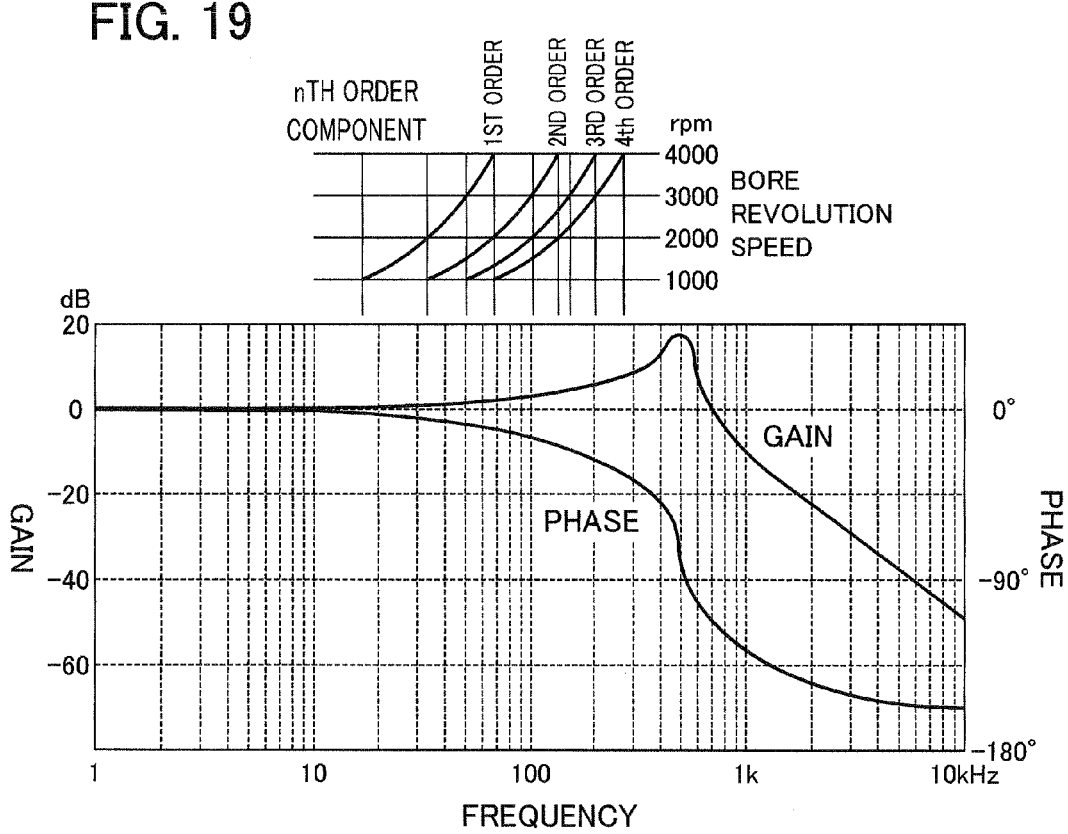
FIG. 19 is a Bode diagram of the device for boring a non-round hole according to the embodiment.

According to the Bode diagram of FIG. 19, it is understood that a resonance frequency exists near 500 Hz, the phase shifts greatly, and the behavior becomes unstable. Therefore, it can be determined that the usable frequency domain is 200 to near 300 Hz.

Accordingly, when considering the boundary of responsiveness of the drive mechanism, k is understood to practically be 4 as the necessary minimum value in performing machining processing.

Figure 20:
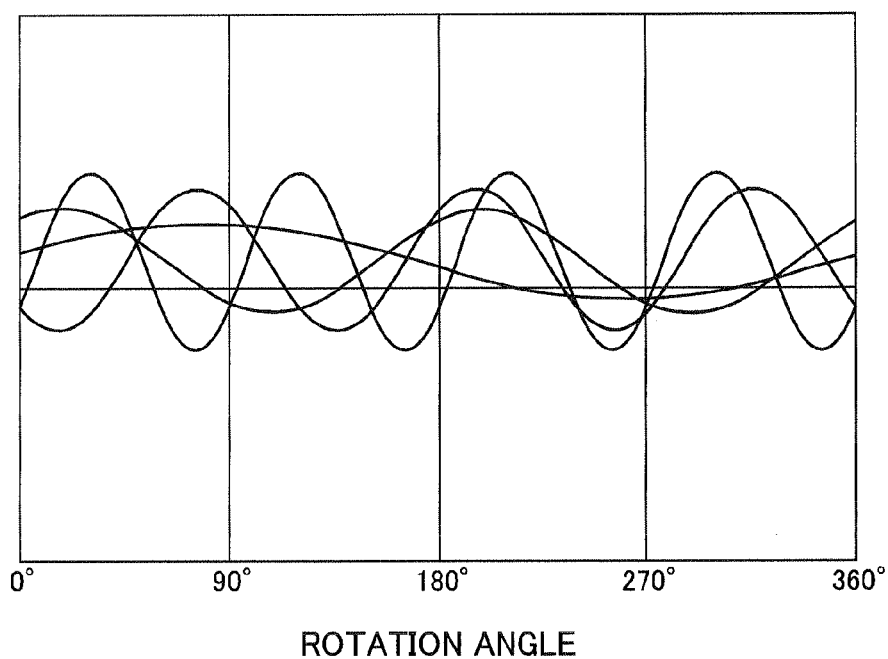
FIG. 20 is a view showing frequency components constituting the inner-diameter shape of the bore of the cylinder block according to the embodiment.

Therefore, when plotting the waveform of the four frequencies of $A_1\times\cos(\theta+P_1)$, $A_2\times\cos(2\theta+P_2)$, $A_3\times\cos(3\theta+P_3)$, and $A_4\times\cos(4\theta+P_4)$, with k=4 in formula (8), it gives FIG. 20.

Figure 21:
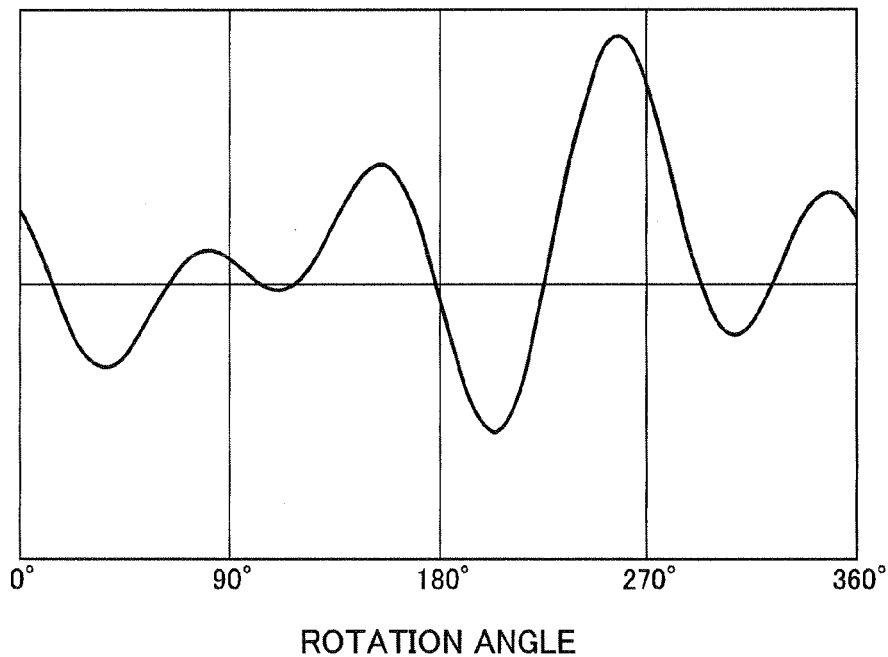
FIG. 21 is a graph showing a state in which the frequency components configuring the inner-diameter shape of the bore of the cylinder block according to the embodiment have been synthesized and inverted.

Next, when synthesizing and plotting the waveforms of these four frequencies by synthesizing, it gives FIG. 21.

In Step S13, a gain and phase map for the gain and phase is generated by the host computer 52 based on the Bode diagram of FIG. 19, and this gain and phase map is output to the synchronization controller 42.

In Step S14, the analytical inner-diameter shape parameter $(A_n, P_n)$ for one cylinder is output by the host computer 52 to the synchronization controller 42.

In Step S15, error parameters $(\Delta a_n, \Delta p_n)$ are obtained by the synchronization controller 42 according to the revolution speed used, referring to the gain and phase map.

In other words, as shown in the Bode diagram of FIG. 19, the gain and phase are shifted, resulting in processing error arising, even if the shaft motor 24 is driven within a usable domain. Therefore, the $n^{th}$ order frequency in a rotation region used is obtained and the gain and phase lag from there are obtained to obtain the error parameters $(\Delta a_n, \Delta p_n)$.

For example, if setting the revolution speed of the shaft motor 24 to 3000 rpm, the frequency of the $4^{th}$ order component will be 3000/60×4=200 Hz, and the gain is read from FIG. 19 to be on the order of 6 dB, and the phase on the order of −27°.

Accordingly, in this case, a projecting amount of the cutting bit lags by about 27° and moves by about twice the amplitude ($10^{6/20}\approx2$, $20\text{ Log}_{10}(2)\approx6$ dB); therefore, the $4^{th}$ order analytical inner-diameter shape parameter is corrected with amplitude correction $\Delta a_4=0.5$, and phase correction $\Delta p_4=+27$. Similarly, correction is performed for $3^{rd}$ order to $1^{st}$ order analytical inner-diameter shape parameters.

In Step S16, the analytical inner-diameter shape parameters $(A_n, P_n)$ are corrected by error parameters $(\Delta a_n, \Delta p_n)$ by way of the synchronization controller 42, and inverse Fourier transformation is performed.

In Step S17, the data thus inverse Fourier transformed by the synchronization controller 42 is corrected by the cam error map of FIG. 10 and converted to the projecting amount of the cutting bit 13 to generate a projecting amount map (synthetic inner-diameter shape map) expressing a relationship between the rotation angle and the projecting amount of the cutting bit 13.

In Step S18, a detailed projecting amount map for boring processing is generated by the synchronization controller 42 by way of proportional interpolation processing based on the projecting amount map of the cutting bit 13.

Figure 22A:
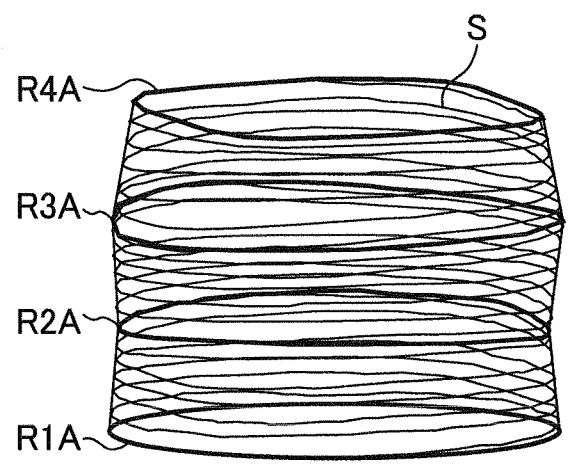
FIG. 22 is a view for illustrating proportion interpolation processing using a projecting amount map generated by the device for boring a non-round hole according to the embodiment.

This is because, when the trajectory of the tip end of the cutting bit 13 in the projecting amount map is set to R1A to R4A, as shown in FIG. 22A, the actual trajectory S of the cutting bit 13 is spiral-shaped, and the interval between like trajectories S is narrower than the interval between trajectories R1A to R4A; therefore, a detailed projecting amount map is necessary.

Figure 22B:
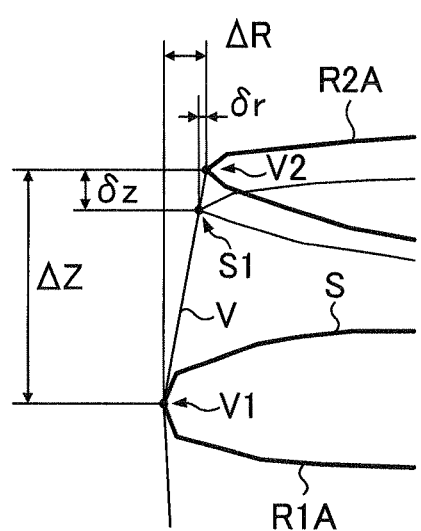

More specifically, for example, a position of a point S1 on the trajectory S positioned between vertically adjacent trajectories R1A and R2A is obtained, as shown in FIG. 22B.

A straight line V passing through the point S1 is drawn, and the intersection of this straight line V with each of the trajectories R1A and R2A are set as points V1 and V2, respectively.

Furthermore, with an interval in a height direction between the point V1 and the point V2 being set as $\Delta Z$, an interval in a horizontal direction between the point V1 and the V2 being set as $\Delta R$, an interval in the height direction from the point V2 to the point S1 being set as $\delta z$, and an interval in the horizontal direction from the point V2 to the point S1 being set as $\delta r$, the position of the point S1 is obtained according to the following formula (9).

$$\Delta R : \delta r = \Delta Z : \delta z \quad (9)$$

In Step S19, the projecting amount of the cutting bit 13 is obtained by the synchronization controller 42 in accordance with the map stored, based on the rotation angle of the arbor 21 and the position of the processing head 10 in the advance/retract direction.

In Step S20, non-round hole processing is performed while adjusting the phases of the arbor 21 and shaft 12, 22 by the synchronization controller 42 in accordance with the projecting amount of the cutting bit 13.

Step S21 determines whether processing for each cylinder has completed, and ends in a case of this determination being YES, whereas Step S14 is returned to in a case of being NO.

According to the present embodiment, there are the following effects.

(2) Conventionally, when attempting to process the shape of a bore with an X-Y table of a single step, for example, a G-code command of 360 lines for the shape of one bore is necessary.

However, with the present invention, since the shape of one bore can be expressed by a total of the nine parameters of A0 to A4 and P1 to P4, the data volume can be greatly reduced compared to conventionally, and thus boring processing of a bore can be performed at high speed.

In addition, only frequency components of low order from among complex inner-diameter shape data containing high-order noise are extracted, and the analytical inner-diameter shape parameters are generated only with the low order frequency components thus extracted; therefore, it is possible to suppress the phases from collapsing while also remarkably having a shape filter effect by removing high-order noise. Therefore, when the device for boring a non-round hole 1 is driven based on this analytical inner-diameter shape parameter, processing a work with high precision is possible because vibration can be reduced.

(3) By compiling A0 to A4 and P1 to P4 separately, it is possible to freely adjust the processing shape by the device for boring a non-round hole 1.

(4) The measurement pitch is set to be larger than the machining pitch, and a projecting amount map (synthetic inner-diameter shape map) at the machining pitch was generated by proportional interpolation processing based on the shape data of the bore measured at the measurement pitch. Therefore, in addition to the data volume being able to be further reduced, the time and labor consumed in processing can be curbed.

For example, if the bore length of an engine is about 100 to 150 mm, and the machining pitch is set to 0.1 mm and the measurement pitch to 5 mm, the data volume can be 1/50 compared to a case of measuring the shape of the bore at the machining pitch.

(5) Since the analytical inner-diameter shape parameters $(A_n, P_n)$ were corrected using the error parameters $(\Delta a_n, \Delta p_n)$, boring processing can be performed taking into consideration the mechanical characteristics of the processing head.

It should be noted that the present invention is not to be limited to the embodiments, and modifications, improvements, etc. in a scope that can achieved the object of the present invention are included in the present invention.

The invention claimed is:

1. A device for boring a non-round hole, comprising:
   a first rotating shaft of cylindrical shape;
   a second rotating shaft that is stored inside of the first rotating shaft;
   a processing tool that is provided to an outer-circumferential face of the first rotating shaft to be able to project and retract;
   a cam that is provided to the second rotating shaft and presses the processing tool in a projecting direction;
   a first detection means for detecting a rotation angle and rotation amount of the first rotating shaft;
   a second detection means for detecting a rotation angle and rotation amount of the second rotating shaft;
   a first drive means for rotationally driving the first rotating shaft;
   a second drive means for rotationally driving the second rotating shaft; and
   a control means for controlling the first drive means and the second drive means based on the rotation angles and rotation amounts detected by the first detection means and second detection means, respectively,
   wherein the control means includes a processing tool control means for controlling projection of the processing tool, and presses a base-end side of the processing tool by the cam and adjusts a projecting dimension of the processing tool by causing the first rotating shaft and the second rotating shaft to synchronously rotate, while causing a phase of the rotation angle of the second rotating shaft to advance or retard relative to a phase of the rotation angle of the first rotating shaft.

2. A device for boring a non-round hole according to claim 1,
   wherein the processing tool is a cutting bit.

3. A device for boring a non-round hole that measures a shape of a hole of a non-round cross-sectional shape already formed, and forms another hole in a work of a shape identical to the hole already formed and measured, the device comprising:
   an inner-diameter shape data acquisition means for setting a plurality of measurement points on an axis of the hole already formed, and measuring and acquiring as inner-diameter shape data an inner-diameter shape of the hole at each of the plurality of measurement points;
   an analytical inner-diameter shape parameter calculation means for frequency analyzing the inner-diameter shape data, and calculating an amplitude value and phase value of frequency components from $0^{th}$ order to $n^{th}$ order (n is a positive integer) as an analytical inner-diameter shape parameter; and an analytical inner-diameter shape parameter storage means for storing the inner-diameter shape parameter thus calculated by the analytical inner-diameter shape parameter calculation means.

4. A device for boring a non-round hole according to claim 3, further comprising:
a Bode diagram storage means for storing a Bode diagram plotting a relationship between a drive frequency of a processing head and a gain and phase lag of the processing head as a Bode diagram map;
an error parameter calculation means for obtaining frequency components from $0^{th}$ order to $n^{th}$ order of an applied drive frequency of the processing head, and calculating, based on the Bode diagram map, a gain and phase lag of each of the frequency components based on the Bode diagram, as an error parameter;
a synthetic inner-diameter shape map generation means for inverting an amplitude value and phase value of frequency components from $0^{th}$ order to $n^{th}$ order calculated by the analytical inner-diameter shape parameter calculation means, after having been corrected and synthesized with the gain and phase lag of each frequency component calculated in the error parameter calculation step, setting the amplitude of data thus inverted to be a projecting amount of a processing tool provided in the processing head to be able to project and retract, and generating a projecting amount map showing a relationship between the projecting amount and a rotation angle of the processing tool; and
a processing tool control means for performing projection control on the processing tool according to the projecting amount map.

5. A device for boring a non-round hole according to claim 3 or 4,
wherein the $n^{th}$ order is $4^{th}$ order.

6. A method for boring a non-round hole in which a shape in which a hole of non-round cross-sectional shape already formed is measured, and another hole of a shape identical to the hole already formed and measured is formed in a work, the method comprising:
an inner-diameter shape data acquisition step of setting a plurality of measurement points on an axis of a hole already formed, and measuring and acquiring as inner-diameter data an inner-diameter shape of the hole at each of the plurality of measurement points;
an analytical inner-diameter shape parameter calculation step of frequency analyzing the inner-diameter shape data, and calculating an amplitude value and phase lag of frequency components from the $0^{th}$ order to $n^{th}$ order (n is a positive integer) as an analytical inner-diameter shape parameter; and
an analytical inner-diameter shape parameter storage step of storing the inner-diameter shape parameter in an electronic storage medium of a processing device.

7. A method for boring a non-round hole in which a bore of a shape identical to a bore of a non-round cross-sectional shape formed in a cylinder block is formed in another bare cylinder block, the method comprising:
a preparation step of mounting a dummy head replicating a finished cylinder head to the bare cylinder block, forming a bore by way of boring processing, and then detaching the dummy head from the cylinder block after having formed the bore;
an inner-diameter shape data acquisition step of setting a plurality of measurement points on an axis of the bore, and measuring and acquiring as inner-diameter data an inner-diameter shape of the bore at each of the plurality of measurement points;
an analytical inner-diameter shape parameter calculation step of frequency analyzing the inner-diameter shape data, and calculating an amplitude value and phase value of frequency components from $0^{th}$ order to $n^{th}$ order (n is a positive integer) as an analytical inner-diameter shape parameter; and
an analytical inner-diameter shape parameter storage step of storing the inner-diameter shape parameter in an electronic storage medium of a processing device.

8. A method for boring a non-round hole according to claim 6 or 7, further comprising:
a Bode diagram storage step of generating a Bode diagram plotting a relationship between a drive frequency of a processing head and a gain and phase lag of the processing head, and storing the Bode diagram in an electronic storage medium of a processing device as a Bode diagram map;
an error parameter calculation step of obtaining frequency components of an applied drive frequency of the processing head from $0^{th}$ order to $n^{th}$ order, and calculating, based on the Bode diagram map, a gain and phase lag of each of the frequency components as an error parameter;
a synthetic inner-diameter shape map generation step of inverting an amplitude value and phase value of frequency components from $0^{th}$ order to $n^{th}$ order calculated in the analytical inner-diameter shape parameter calculation step, after having been corrected and synthesized with the gain and phase lag of each frequency component calculated in the error parameter calculation step, setting the amplitude of data thus inverted to be a projecting amount of a processing tool provided in the processing head to be able to project and retract, and generating a projecting amount map showing a relationship between the projecting amount and a rotation angle of the processing tool; and
a boring step of causing the processing tool to project according to the projecting amount map, and conducting boring processing on an unprocessed work.

9. A method for boring a non-round hole according to any one of claims 6 to 8,
wherein the $n^{th}$ order is $4^{th}$ order.

* * * * *